US011347882B2

(12) United States Patent
Gigov et al.

(10) Patent No.: US 11,347,882 B2
(45) Date of Patent: May 31, 2022

(54) METHODS AND SYSTEMS FOR SECURE DATA SHARING WITH GRANULAR ACCESS CONTROL

(71) Applicants: Nikolay Gigov, Waterloo (CA); Yin Tan, Waterloo (CA)

(72) Inventors: Nikolay Gigov, Waterloo (CA); Yin Tan, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/890,598

(22) Filed: Jun. 2, 2020

(65) Prior Publication Data

US 2021/0374265 A1 Dec. 2, 2021

(51) Int. Cl.
*G06F 21/62* (2013.01)
*G06F 21/53* (2013.01)
(Continued)

(52) U.S. Cl.
CPC .......... *G06F 21/6218* (2013.01); *G06F 21/53* (2013.01); *G06F 21/57* (2013.01);
(Continued)

(58) Field of Classification Search
CPC ......... H04L 9/08; H04L 9/0825; H04L 9/088; H04L 9/30; H04L 9/14; H04L 9/3073; H04L 9/0827; H04L 63/20; H04L 63/205; G06F 21/602; G06F 21/6209; G06F 21/645; G06F 21/6218; G06F 21/53; G06F 21/57;
(Continued)

(56) References Cited

U.S. PATENT DOCUMENTS 9,525,668 B2 * 12/2016 Bhargav-Spantzel ..................... H04L 9/3234
10,211,984 B2 * 2/2019 Asim ..................... H04L 9/088
(Continued)

FOREIGN PATENT DOCUMENTS

| CN | 107743133 A | 2/2018 |
| CN | 107846397 A | 3/2018 |
| CN | 110519049 A | 11/2019 |

OTHER PUBLICATIONS

International Search Report, dated Apr. 7, 2021, application No. PCT/CN2021/073864.
(Continued)

*Primary Examiner* — Shaqueal D Wade-Wright

(57) ABSTRACT

Methods and devices for secure data sharing with granular access control are described. A modified attribute-based encryption (ABE) scheme is used to perform cryptographically-enforced ABE using attributes of a file access policy. A sender sends to a receiver a file encrypted using a file encryption key, the file encryption key encrypted using ABE based on a file access policy set by the sender, and a set of private ABE keys decryptable using a key stored in a trusted execution environment (TEE) of the receiver. The private ABE keys are decrypted by the receiver TEE when the file is accessed, decrypting a file encryption key only when the attributes of the receiver access action satisfy the file access policy. The decrypted file encryption key grants access to the file contents via a trusted viewer application. A user password may also be required and cryptographically enforced as part of the ABE decryption.

20 Claims, 13 Drawing Sheets

(51) Int. Cl.
*G06F 21/57* (2013.01)
*H04L 9/30* (2006.01)
*H04L 29/06* (2006.01)
*G06F 21/72* (2013.01)

(52) U.S. Cl.
CPC .......... *G06F 21/725* (2013.01); *H04L 9/3073* (2013.01); *H04L 63/205* (2013.01); *G06F 2221/2137* (2013.01)

(58) Field of Classification Search
CPC . G06F 21/72; G06F 21/725; G06F 2221/2137
See application file for complete search history.

(56) References Cited

U.S. PATENT DOCUMENTS

| | | | |
|---|---|---|---|
| 2016/0055347 A1* | 2/2016 | Park | H04L 9/0825 713/165 |
| 2017/0053248 A1* | 2/2017 | Wakefield | G06Q 10/1095 |
| 2018/0101688 A1 | 4/2018 | Zage et al. | |
| 2020/0145200 A1* | 5/2020 | Le Van Gong | H04L 9/30 |
| 2020/0287901 A1* | 9/2020 | Avetisov | H04L 9/088 |

OTHER PUBLICATIONS

Bethencourt, J., Sahai, A., and Waters, B. Ciphertext-policy attribute-based encryption, published in: IEEE Symposium on Security and Privacy, pp. 321-334 (2007) 2007.

A. Kato, M. Scott, T. Kobayashi, and Y. Kawahara. Barreto-Naehrig Curves—draft-kasamatsu-bncurves-02 (2016) 2016.

Aranha D.F., Fuentes-Castañeda L., Knapp E., Menezes A., Rodríguez-Henríquez F. (2013) Implementing Pairings at the 192-Bit Security Level. In: Abdalla M., Lange T. (eds) Pairing-Based Cryptography—Pairing 2012. Pairing 2012. Lecture Notes in Computer Science, vol. 7708. Springer, Berlin, Heidelberg 2012.

S. Scott, N. Sullivan, and C. Wood in Hashing to Elliptic Curves—draft-irtf-cfrg-hash-to-curve-03 (2019) 2019.

Adi Shamir. 1979. How to share a secret. Commun. ACM 22, 11 (Nov. 1979), 612-613 1979.

* cited by examiner

METHODS AND SYSTEMS FOR SECURE DATA SHARING WITH GRANULAR ACCESS CONTROL

FIELD

The present disclosure is related to methods and systems for secure data sharing, such as granular access control using attribute based encryption, which may include the use of a trusted execution environment of a processor device.

BACKGROUND

When data is shared with a remote device, the sender of the data may wish to control the conditions under which the receiver may access the data. Existing techniques for controllable, revocable, fine-grained permissioned data sharing rely on cloud-based systems, which may not be suitable for low-power environments such as mobile phones or Internet of Things (IoT) devices. In particular, such cloud-based solutions typically require a trusted hardware security module (HSM) to be deployed on a cloud server to provide the root of trust, typically resulting in high cost and low flexibility.

Furthermore, existing techniques typically enforce the access policy set by the sender using logic coded into software, such as a policy engine, potentially exposing the policy engine software to exploits.

Existing techniques also typically exhibit one or more additional limitations. Some require storage of the sensitive data in the cloud, requiring the receiver to re-download the data each time it is accessed. Some may require decryption to take place on the cloud server, not the receiver device, potentially undermining the security of the link between the server and the receiver. Some may be limited in the access policy parameters they enable: some may not allow a sender to revoke or update an access policy, to limit the number of data access attempts by a receiver, or to set an expiration date for access permissions.

Thus, there is a need for a data sharing scheme which overcomes one or more of the above-noted disadvantages of existing techniques.

SUMMARY

In various embodiments described herein, methods and devices are provided for secure data sharing with granular access control.

Various embodiments may enable granular access control for shared data. A peer-to-peer sharing system may be used to implement data sharing and access control, unmediated by a cloud server. A trusted hardware module on the receiver side may provide a root of trust to authorize access to locally-stored data at the receiver. Access policy enforcement may be protected against software exploits by enforcing the policy cryptographically.

In some aspects, the present disclosure describes a receiver-side method for secure data sharing. A receiver device includes a processor device comprising a trusted execution environment (TEE), the TEE comprising a private receiver TEE key. A file is received at the receiver. The file is encrypted using a file encryption key. The file encryption key is also received at the receiver. The file encryption key is encrypted using a master public attribute-based encryption (ABE) key of a sender and an access policy for the file. A set of one or more private ABE keys is also received at the receiver. The set of one or more private ABE keys have been generated using the access policy and encrypted using a public receiver TEE key. The trusted execution environment is used to apply the private receiver TEE key to decrypt the set of private ABE keys and provide at least a first private key of the set of private ABE keys to the processor device. The processor device is used to decrypt the file encryption key using the first private ABE key and a set of attribute values satisfying the access policy. The processor device is used to apply the file encryption key to decrypt the file, thereby generating a decrypted file.

In some examples, the method further comprises, prior to receiving the file, file encryption key, and set of private ABE keys, receiving a setup request from a sender, the setup request comprising the access policy. In response to receiving the setup request, the TEE is used to generate the public receiver TEE key and the private receiver TEE key. A response is sent to the sender, the response comprising the public receiver TEE key.

In some examples, the response further comprises a key attestation report comprising a device identifier of the receiver device.

In some examples, the receiver device further comprises a trusted clock. The access policy comprises an expiry date for a permission of the receiver device to access the file. The trusted execution environment applies the private receiver TEE key to decrypt the set of private ABE keys in response to determining that the expiry date has not been reached using the trusted clock. The key attestation report comprises a confirmation of the expiry date.

In some examples, one or more of the attribute values are received from a trusted viewer. The method further comprises, after decrypting the file, using the trusted viewer to make contents of the decrypted file available to a user.

In some examples, the method further comprises, after making contents of the file available to the user, using the trusted viewer to delete the decrypted file.

In some examples, the access policy comprises a notification condition in association with an access action. The method further comprises, in response to determining that the notification condition has been satisfied, sending a notification to the sender, the notification identifying the access action. In response to determining that the notification has been successfully sent, the access action is enabled at the receiver device.

In some examples, sending a notification to the sender comprises determining whether the sender is available to receive notifications and, in response to determining that the sender is not available to receive notifications, sending the notification to a server.

In some examples, the access policy comprises a plurality of attribute configurations, each attribute configuration comprising a plurality of attribute values authorizing access to the file contents. The set of private ABE keys comprises a plurality of private ABE keys, each private ABE key corresponding to an attribute configuration. The set of attribute values satisfying the access policy comprises the plurality of attribute values of the attribute configuration corresponding to the first private ABE key. The step of decrypting the file encryption key is performed using the first private ABE key and the set of attribute values satisfying the access policy.

In some examples, the set of attribute values satisfying the access policy includes an attribute indicating the number of times the file has been opened at the receiver device. The first private ABE key is selected from the set of private ABE keys by the trusted execution environment in response to determining a number of times the file has been opened at the receiver device, N, and determining that the set of attribute values satisfying the access policy includes a value for the attribute indicating the number of times the file has been opened at the receiver device that corresponds to N.

In some examples, the file encryption key is decrypted using the first private ABE key, the set of attribute values satisfying the access policy, and a password provided by a user.

In some aspects, the present disclosure describes a receiver device configured to perform the method steps described above.

In some aspects, the present disclosure describes a sender-side method for secure sharing. A trusted execution environment (TEE) of a processor device of a sender device is used to decrypt a master private attribute based encryption (ABE) key of the sender device using a private sender TEE key of the trusted execution environment. A file is encrypted using a file encryption key. The file encryption key is encrypted using a master ABE key of the sender device and an access policy for the file. A set of one or more private ABE keys is generated using the decrypted master private ABE key of the sender device and the access policy. The set of private ABE keys is encrypted using a public TEE key of a receiver. The encrypted file, the encrypted file encryption key, and the encrypted set of private ABE keys are sent to the receiver device.

In some examples, the method further comprises, prior to sending the encrypted file, encrypted file encryption key, and encrypted set of private ABE keys, sending a setup request to the receiver device, the setup request comprising the access policy, and receiving a response from the receiver device, the response comprising the public receiver TEE key.

In some examples, the response further comprises a key attestation report comprising a device identifier of the receiver device.

In some examples, the access policy comprises an expiry date for a permission of the receiver device to access the file. The encrypted file, encrypted file encryption key, and encrypted set of private ABE keys are sent to the receiver device in response to determining that the key attestation report includes confirmation of the expiry date.

In some examples, the access policy comprises a plurality of receiver attribute configurations, each receiver attribute configuration comprising a plurality of receiver attribute values authorizing receiver device access to contents of the file. The set of private ABE keys comprises a plurality of private ABE keys, each private ABE key corresponding to a receiver attribute configuration.

In some examples, the access policy is a dynamic access policy. The method further comprises, prior to decrypting the file encryption key, sending a policy confirmation request to a dynamic policy server and, in response to receiving a policy confirmation from the dynamic policy server indicating that the dynamic access policy is valid, decrypting the file encryption key.

In some examples, the dynamic policy server is the sender device.

In some aspects, the present disclosure describes a sender device configured to perform the method steps described above.

In some aspects, the present disclosure describes a receiver device. The receiver device includes a processor device comprising a trusted execution environment (TEE), the TEE comprising a private receiver TEE key. The receiver device includes a memory containing instructions that, when executed by the processor device, cause the receiver device to carry out the following steps. An encrypted file, an encrypted file encryption key, and an encrypted set of one or more private ABE keys are received. A decrypted first private ABE key of the encrypted set of private ABE keys is received from the trusted execution environment. The first private ABE key and a set of attribute values satisfying the access policy are used to decrypt the file encryption key. The file encryption key is applied to decrypt the file, thereby generating a decrypted file. The trusted execution environment is configured to decrypt the encrypted set of private ABE keys using the private receiver TEE key and provide the decrypted first private ABE key to the processor device.

In some aspects, the present disclosure describes a sender device. The sender device includes a processor device comprising a trusted execution environment (TEE), the TEE comprising a private sender TEE key. The sender device includes a memory containing instructions that, when executed by the processor device, cause the sender device to perform the following steps. A file is encrypted using a file encryption key. The file encryption key is encrypted using a master attribute based encryption (ABE) key of the sender device and an access policy for the file. A set of one or more private ABE keys are generated using the decrypted master private ABE key of the sender device and the access policy. The set of private ABE keys is encrypted using a public TEE key of a receiver. The encrypted file, the encrypted file encryption key, and the encrypted set of private ABE keys are sent to the receiver. The trusted execution environment is configured to decrypt a master private ABE key of the sender device using the private sender TEE key and provide the decrypted master private ABE key to the processor device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that help to enable content delivery from a server and achieve data privacy from the operator of the server, using a trusted secure intermediate environment. The disclosed approach may be implemented using considerably lower computational and memory costs per served request, which may enable economically viable commercialization of such a solution.

Examples and embodiments described herein make use of attribute-based encryption (ABE), an encryption and decryption scheme using several different keys generated in accordance with operations described below in the sections on Attribute-Based Encryptions and Modified BSW CP-ABE. ABE encrypts data by using a set of attribute values and a master public ABE key to generate an access tree and a set of group elements constituting the encrypted data. One or more private ABE keys are generated corresponding to the attribute values; these are communicated to the receiver of the encrypted data, who uses one of the private ABE keys and a matching set of attributes values to decrypt the encrypted data. Decryption proceeds in two stages: first, a modified version of one of the private ABE keys is generated by applying the attribute values to transform the received private ABE key. Then, the modified private ABE key is used to decrypt the encrypted data. Because the attribute values were used to encrypt the data, decryption is only successful if the same attribute values are used to decrypt it. Attribute values of the receiver that are required by a data access policy of the sender are therefore cryptographically enforced using ABE as described above. In some embodiments described herein, a password may be used along with the attribute values in the encryption and decryption operations.

Example System, Sender Device, and Receiver Device

Figure 1:
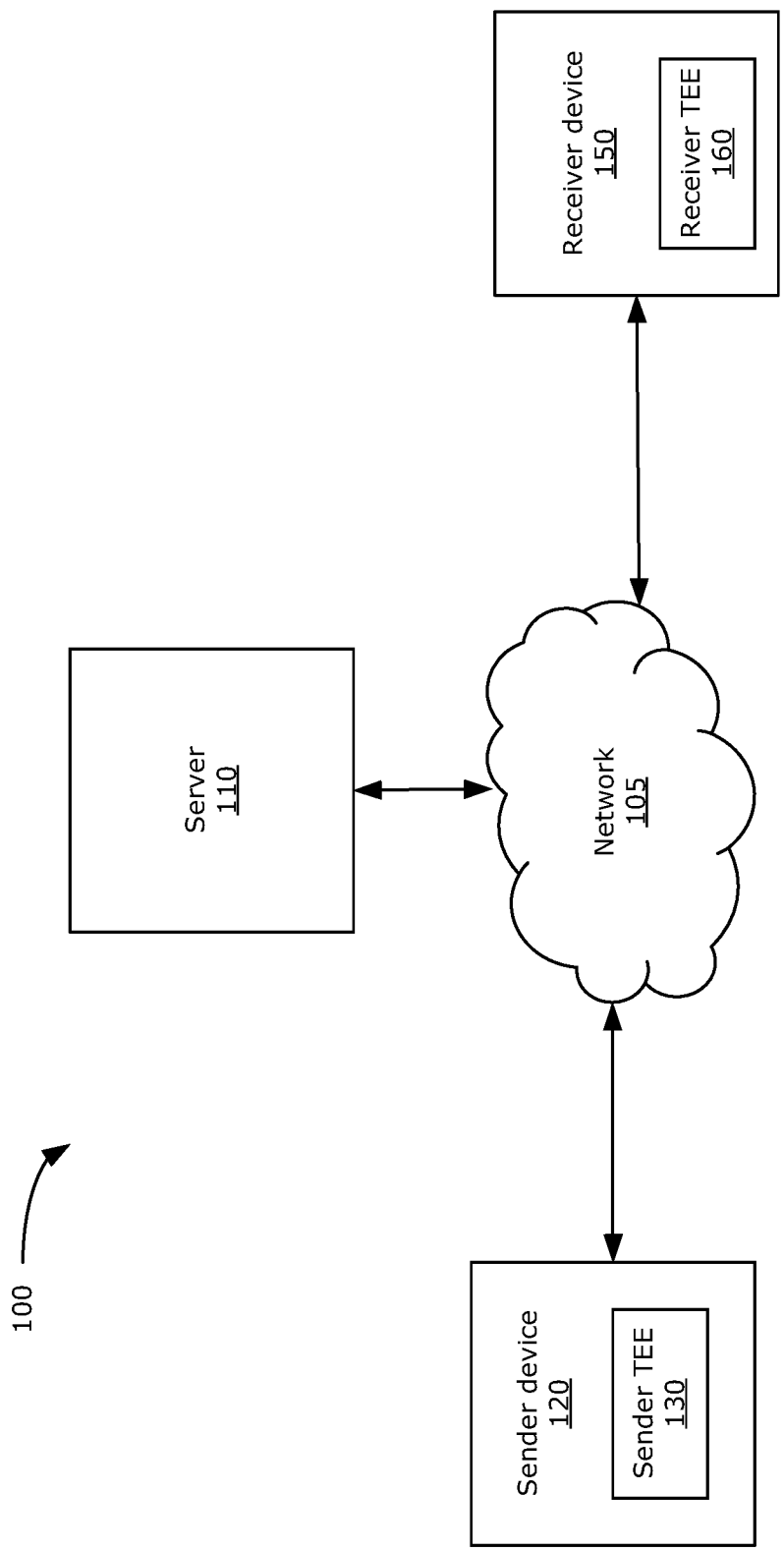
FIG. 1 is a block diagram illustrating an example simplified system in which examples disclosed herein may be implemented.
Figure 2:
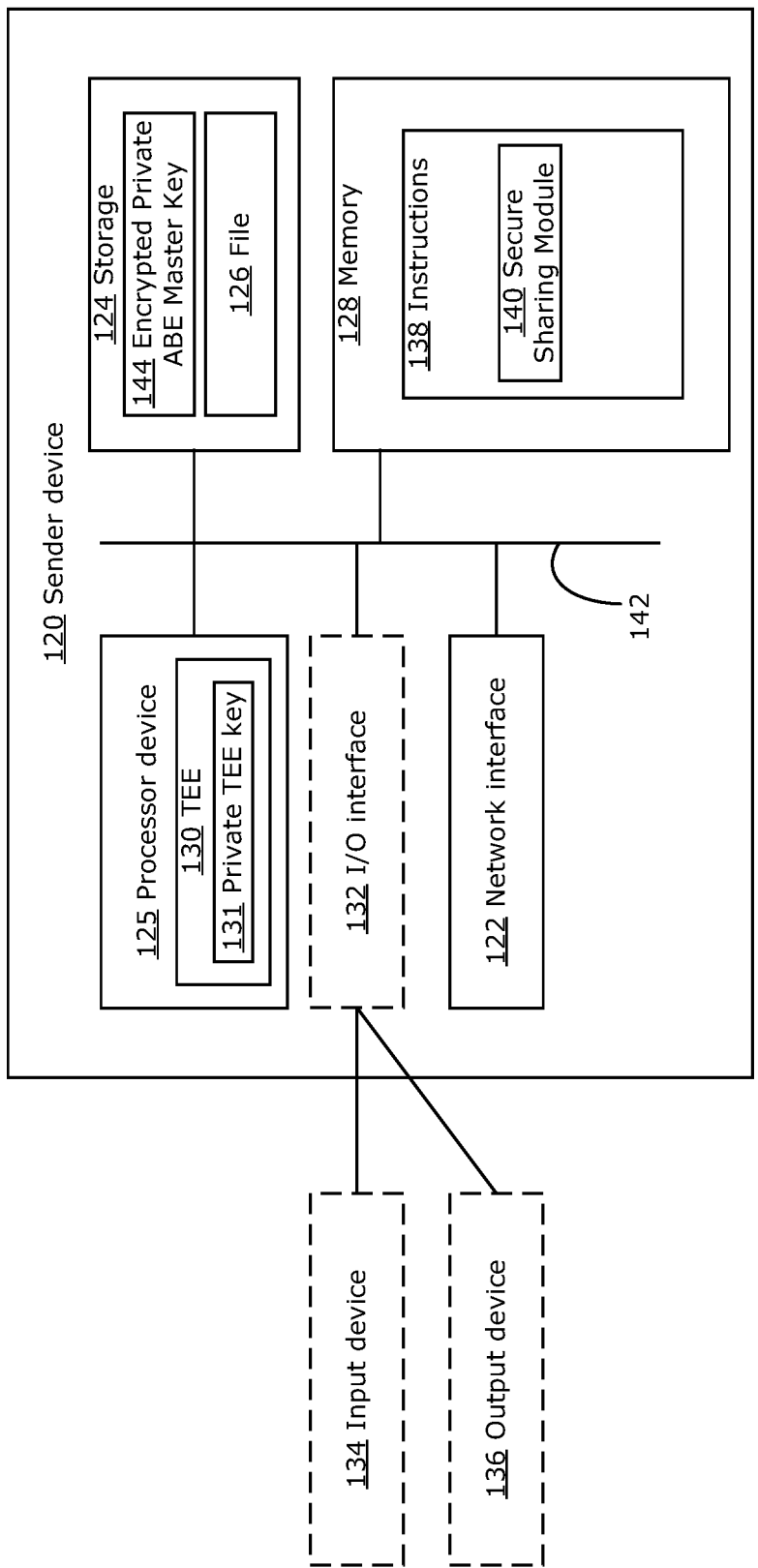
FIG. 2 is a block diagram of an example sender device that may be used to implement examples described herein.
Figure 3:
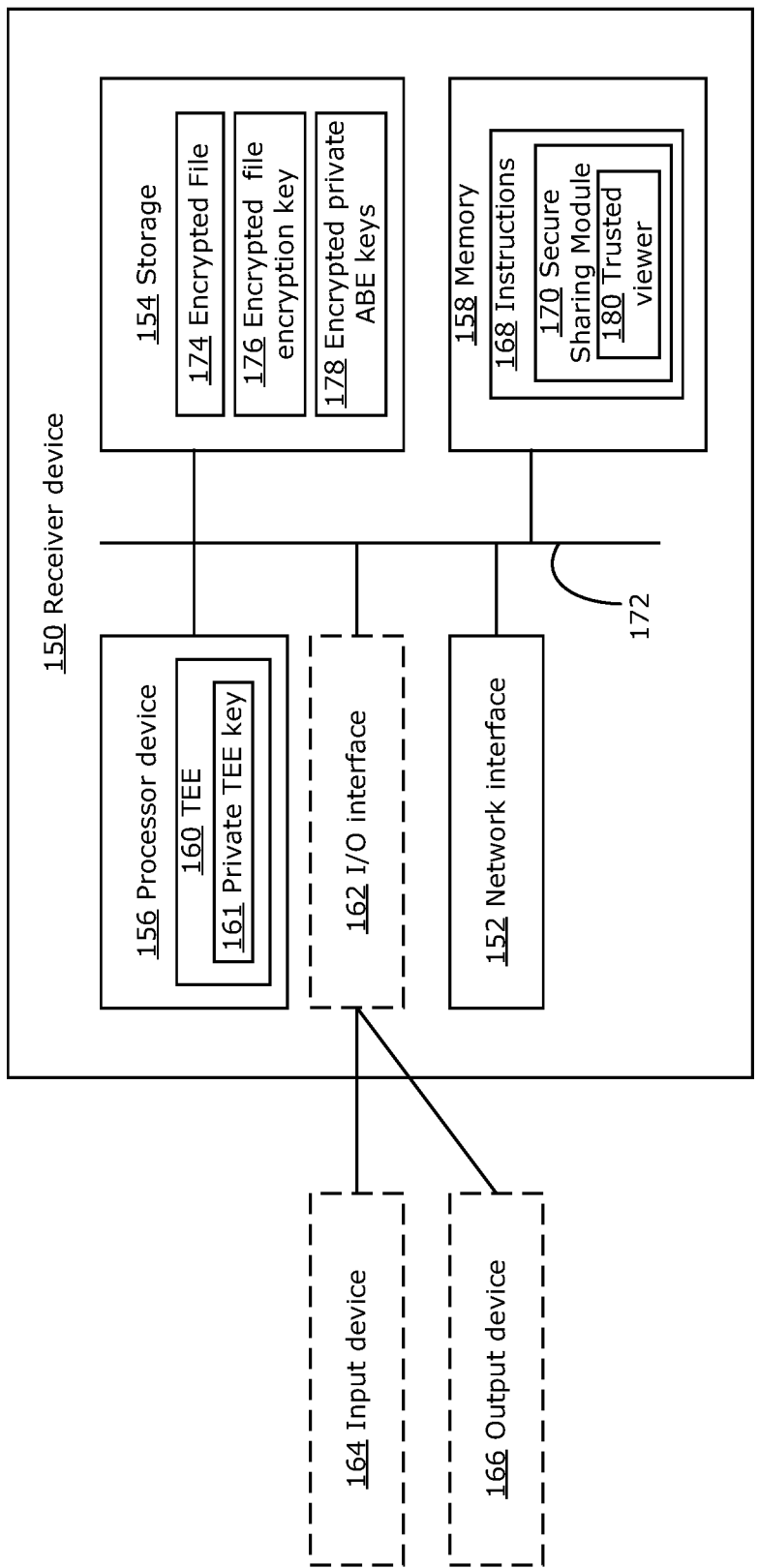
FIG. 3 is a block diagram of an example receiver device that may be used to implement examples described herein.

To assist in understanding the present disclosure, FIGS. 1-3 are first discussed.

FIG. 1 illustrates an example system 100 including a network 105. The system 100 has been simplified in this example for ease of understanding; generally, there may be more entities and components in the system 100 than that shown in FIG. 1. The network 105 may be any form of network (e.g., an intranet, the Internet, a P2P network, a WAN and/or a LAN) and may be a public network. The system 100 may be used for distribution of data, sent by a sender device 120 to a receiver device 150. The sender device 120 and/or receiver device 150 may be, for example, personal electronic devices or network servers. A server 110 may be used by the sender device 120 and/or the receiver device 150 to facilitate certain aspects of the methods described herein. Communications between the sender device 120, receiver device 150, and server 110 may be over the network 105 or another network (which may be private or public), using wired or wireless connections or a combination thereof. A trusted, secure environment, such as a trusted execution environment (TEE) of a processor device, exists within the sender device 120 (shown as sender TEE 130) and the receiver device 150 120 (shown as receiver TEE 160), as discussed further below.

FIG. 2 is a block diagram illustrating a simplified example of the sender device 120. Other examples suitable for implementing embodiments described in the present disclosure may be used, which may include components different from those discussed below. Although FIG. 2 shows a single instance of each component, there may be multiple instances of each component in the sender device 120.

The sender device 120 may include one or more processor devices 125, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The sender device 120 may also include one or more optional input/output (I/O) interfaces 132, which may enable interfacing with one or more optional input devices 134 and/or optional output devices 136.

In the example shown, the input device(s) 134 (e.g., a keyboard, a mouse, a microphone, a touchscreen, and/or a keypad) and output device(s) 136 (e.g., a display, a speaker and/or a printer) are shown as optional and external to the sender device 120. In other examples, there may not be any input device(s) 134 and output device(s) 136, in which case the I/O interface(s) 132 may not be needed.

The sender device 120 may include one or more network interfaces 122 for wired or wireless communication with the network 105, the receiver device 150, or other entity or node in the system 100. The network interface(s) 122 may include wired links (e.g., Ethernet cable) and/or wireless links (e.g., one or more antennas) for intra-network and/or inter-network communications.

The sender device 120 may also include one or more storage units 124, which may include a mass storage unit such as a solid state drive, a hard disk drive, a magnetic disk drive and/or an optical disk drive. The storage unit(s) 124 may store one or more files 126 that may be requested by and transmitted to the receiver device 150, as discussed further below. A file 126 in some embodiments may not be limited to a file per se and may be any data object. A file 126 may include any type of content, such as text, numerical, image, audio and/or video data in any format. Files 126 stored by the sender device 120 may be transmitted to the receiver device 150 via one or more other devices other than the sender device 120, such as the server 110 or other devices in communication with network 105. Files 126 may be encrypted prior to transmission, as further discussed below.

The sender device 120 may include one or more memories 128, which may include a volatile or non-volatile memory (e.g., a flash memory, a random access memory (RAM), and/or a read-only memory (ROM)). The non-transitory memory(ies) 128 may store instructions for execution by the processor device(s) 125, such as to carry out examples described in the present disclosure. The memory(ies) 128 may include other software instructions 138, such as for implementing an operating system and other applications/functions. In some examples, the memory(ies) 128 may include software instructions 138 for execution by the processor device 125 to implement a secure sharing module 140 for secure sharing of files 126 with the receiver device 150, as described further below. In some examples, the sender device 120 may additionally or alternatively execute instructions from an external memory (e.g., an external drive in wired or wireless communication with the sender device 120) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The sender device 120 also includes a trusted, secure environment, for example a TEE 130 implemented as part of the processor device 125, in which operations can be performed that are obfuscated or hidden from the operator of the sender device 120. The TEE 130 includes a private TEE key 131 of the sender device, which is inaccessible to an operator or user of the sender device 120 and may only be used by the TEE 130. Although the TEE 130 is shown as an example of a hardware-enabled trusted environment within the sender device 120, the trusted environment may be implemented in other ways. The trusted environment, whether implemented using the TEE 130 or in other ways, protects the privacy and security of data and operations performed within the trusted environment. The trusted environment has security features (typically physical security features) that provide tampering resistance, which protects the integrity of stored data, encryption keys and instructions executed in the trusted environment. The trusted environment provides a secure intermediate environment that is trusted by the receiver device 150 for private and secure data transfer from the sender device 120. In some examples, the trusted environment may be any secure environment that mediates data transfer from the sender device 120 to the receiver device 150, and may include a trusted environment that is provided by hardware external to the sender device 120. For example, the trusted environment may be within the server 110 or within another network entity, among other possibilities. For simplicity, the present disclosure will refer to the TEE 130; however, it should be understood that the trusted environment may be implemented in other ways. For example, the trusted environment may also be implemented using a hardware security module (HSM) or trusted platform module (TPM), among other possibilities.

It should be noted that although the TEE 130 is within the sender device 120, because the TEE 130 is protected from the operator of the sender device 120, the TEE 130 may be discussed and represented herein as a component separate from the overall sender device 120, even though the TEE 130 may physically be implemented within the sender device 120. In the example where the TEE 130 is within the sender device 120, signals and data may be communicated between the TEE 130 and the overall sender device 120 (i.e., the sender device 120 environment external to the TEE 130). Thus, the TEE 130 may be considered to receive and transmit electronic signals and data from and to the sender device 120 despite being physically part of the sender device 120 in some embodiments. For example, such communications between the sender device 120 and the TEE 130 within the sender device 120 may involve internal communications between physical chips of the sender device 120, among other possible implementations.

The sender device 120 may also include a bus 142 providing communication among components of the sender device 120, including those components discussed above. The bus 142 may be any suitable bus architecture including, for example, a memory bus, a peripheral bus or a video bus.

FIG. 3 is a block diagram illustrating a simplified example of the receiver device 150. Other examples suitable for implementing embodiments described in the present disclosure may be used, which may include components different from those discussed below. Although FIG. 3 shows a single instance of each component, there may be multiple instances of each component in the receiver device 150.

The receiver device 150 may be any suitable end user device for wireless operation and may include such devices (or may be referred to) as a user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, smart device, or consumer electronics device, among other possibilities.

As shown in FIG. 3, the receiver device 150 includes at least one processor device 156. The processor device 156 implements various processing operations of the receiver device 150. For example, the processor device 156 could perform signal coding, data processing, power control, input/output processing, or any other functionality enabling the receiver device 150 to operate in the system 100. The processor device 156 may also be configured to implement some or all of the functionality and/or embodiments described herein. The processor device 156 may be, for example, a processor, a microprocessor, a digital signal processor, an application-specific integrated circuit (ASIC), a field-programmable gate array (FPGA), a dedicated logic circuitry, a dedicated artificial intelligence processor unit, or combinations thereof.

The receiver device 150 may also include one or more optional input/output (I/O) interfaces 162, which may enable interfacing with one or more optional input devices 164 and/or optional output devices 166. The input/output device(s) 164, 166 permit interaction with a user, for example. Each input/output device 164, 166 includes any suitable structure for providing information to or receiving information from a user, such as a speaker, microphone, keypad, keyboard, display, or touchscreen, among other possibilities. In some examples, a single device may provide both input and output capabilities, such as a touchscreen.

The receiver device 150 also includes one or more network interfaces 152 to enable communications in the system 100. The network interface(s) 152 include any suitable structure for generating signals for wireless or wired transmission and/or processing signals received wirelessly or by wire. The network interface(s) 152 may include wired links (e.g., Ethernet cable) and/or wireless links (e.g., one or more antennas) for intra-network and/or inter-network communications. In some examples, the network interface(s) 152 may include separate transmitter and receiver components; in other samples, the network interface(s) 152 may include a transceiver component that combines the functions of a transmitter and a receiver.

The receiver device 150 may also include one or more storage units 154, which may include a mass storage unit such as a solid state drive, a hard disk drive, a magnetic disk drive and/or an optical disk drive. The receiver device 150 may also include one or more memories 158, which may include a volatile or non-volatile memory (e.g., a flash memory, a random access memory (RAM), and/or a read-only memory (ROM)). The non-transitory memory(ies) 158 may store instructions for execution by the processor device(s) 156, such as to carry out examples described in the present disclosure. The memory(ies) 158 may include other software instructions, such as for implementing an operating system and other applications/functions. In some examples, the memory(ies) 158 may include software instructions 168 for execution by the processor device 156 to implement a secure sharing module 170 for secure sharing of files 126 from the sender device 120, as described further below. In some embodiments, the secure sharing module 170 may include a trusted viewer 180 for securely viewing (or otherwise making available to a user) contents of files 126 shared by the sender device 120.

The storage units 154 may be used in some embodiments to store encrypted data used by the secure sharing module 170, including encrypted files 174, encrypted files encryption keys 176, and encrypted private attribute-based encryption (ABE) keys 178, as described further below.

In some examples, the receiver device 150 may additionally or alternatively execute instructions from an external memory (e.g., an external drive in wired or wireless communication with the receiver device 150) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The receiver device 150 also includes a trusted, secure environment, for example a TEE 160 implemented as part of the processor device 156, in which operations can be performed that are obfuscated or hidden from the operator of the receiver device 150. The TEE 160 includes a private TEE key 161 of the sender device, which is inaccessible to an operator or user of the receiver device 150 and may only be used by the TEE 160. Although the TEE 160 is shown as an example of a hardware-enabled trusted environment within the receiver device 150, the trusted environment may be implemented in other ways. The trusted environment, whether implemented using the TEE 160 or in other ways, protects the privacy and security of data and operations performed within the trusted environment. The trusted environment has security features (typically physical security features) that provide tampering resistance, which protects the integrity of stored data, encryption keys and instructions executed in the trusted environment. The trusted environment provides a secure intermediate environment that is trusted by the sender device 120 for private and secure data transfer from the sender device 120. In some examples, the trusted environment may be any secure environment that mediates data transfer from the sender device 120 to the receiver device 150, and may include a trusted environment that is provided by hardware external to the receiver device 150. For example, the trusted environment may be within the server 110 or within another network entity, among other possibilities. For simplicity, the present disclosure will refer to the TEE 160; however, it should be understood that the trusted environment may be implemented in other ways. For example, the trusted environment may also be implemented using a hardware security module (HSM) or trusted platform module (TPM), among other possibilities.

It should be noted that although the TEE 160 is within the receiver device 150, because the TEE 160 is protected from the operator of the receiver device 150, the TEE 160 may be discussed and represented herein as a component separate from the overall receiver device 150, even though the TEE 160 may physically be implemented within the receiver device 150. In the example where the TEE 160 is within the receiver device 150, signals and data may be communicated between the TEE 160 and the overall receiver device 150 (i.e., the receiver device 150 environment external to the TEE 160). Thus, the TEE 160 may be considered to receive and transmit electronic signals and data from and to the receiver device 150 despite being physically part of the receiver device 150 in some embodiments. For example, such communications between the receiver device 150 and the TEE 160 within the receiver device 150 may involve internal communications between physical chips or memory of the receiver device 150, among other possible implementations.

The receiver device 150 may also include a bus 172 providing communication among components of the receiver device 150, including those components discussed above. The bus 172 may be any suitable bus architecture including, for example, a memory bus, a peripheral bus or a video bus.

Attribute-Based Encryption (ABE)

Example methods and devices described herein may use a modified version of ciphertext-policy attribute-based encryption ("CP-ABE") described by Bethencourt, J., Sahai, A., and Waters, B. in Ciphertext-policy attribute-based encryption, published in: IEEE Symposium on Security and Privacy, pp. 321-334 (2007), available at https://www.cs.utexas.edu/~bwaters/publications/papers/cp-abe.pdf, which is hereby incorporated by reference in its entirety. The CP-ABE variant described in the aforementioned reference shall be referred to herein as "BSW CP-ABE". References herein to "ABE" or "attribute-based encryption" should be assumed to refer specifically to BSW CP-ABE or the modified version thereof unless otherwise indicated.

CP-ABE is an encryption scheme used to provide control of data access. ABE-based data access control solutions typically exhibit two qualities. First, they encode a data access policy in a ciphertext: during an encryption stage, an access policy controlling access to and use of data is combined with the plaintext to generate the ciphertext (i.e. the requested data stored or transmitted in encrypted form). Second, the conditions of use are enforced cryptographically: during a decryption stage, attributes supplied by the user requesting access to data are checked cryptographically, with decryption succeeding only if the desired conditions of use (i.e. the access policy) are satisfied.

The entity controlling access to the data, hereinafter referred to as the "sender", may configure an access policy such that only someone satisfying this policy can decrypt the ciphertext. For example, a policy could look like "Security_level>=3 AND Name=John". The user requesting the data, hereinafter referred to as the receiver, is associated with a set of attributes. For example, a user may have the following attributes: "Name=Sarah", "Age=35", "Security_level=2". In CP-ABE, the policy is encoded in the ciphertext, and the receiver holds a private encryption key which encodes the receiver's attributes. A receiver can decrypt a ciphertext if and only if the attributes corresponding to the receiver's private key satisfy the policy which has been encoded into the ciphertext at the encryption stage.

BSW CP-ABE consists of 4 phases: Setup, Key Generation (also referred to as Keygen), Encryption, and Decryption.

The Setup phase is executed by the sender. This generates a set of public parameters, a Public Key (also referred to herein as a "Master Public Key" or "Master Public ABE Key"), and a Master Secret Key (also referred to herein as a "Master Secret ABE Key"). The public parameters include pairing-related information as described below. The Public Key and Master Secret Key are stored with the sender.

The Key Generation phase begins when the sender receives a set of attributes from the receiver. The sender first verifies the attributes: if the attributes supplied by the receiver do not align with the sender's expectations, the sender may terminate the process. Otherwise, using the verified attributes and the Master Secret Key, the sender generates a Private Key corresponding to these attributes (also referred to herein as a "Private ABE Key") and communicates the Private Key to the receiver.

The Encryption phase is executed by the sender. Using the policy and the Public Key, the sender encrypts the message (i.e. the data being communicated to the receiver) to generate a ciphertext. The policy is parsed to generate an "access tree", where the leaf nodes contain "attribute=value" pairs. A computation is performed on the (attribute, value) pair of each leaf node to generate two group elements. The access tree, along with the computed group elements, constitute the ciphertext. The (attribute, value) pairs in the leaf nodes are public in BSW CP-ABE. When used to encrypt data during the Encryption phase, the Public Key may be referred to as a "master ABE key".

The Decryption phase is executed by the receiver. The receiver uses the Private Key received from the sender to decrypt the ciphertext. The decryption succeeds only if the Private Key satisfies the policy, and fails if it does not.

Each of the four phases of BSW CP-ABE is now described in greater detail.

The Setup phase uses elliptic curve pairing with map e: G1×G2→GT. Pairing parameters are described by A. Kato, M. Scott, T. Kobayashi, and Y. Kawahara in *Barreto-Naehrig Curves—draft-kasamatsu-bncurves*-02 (2016), available at https://tools.ietf.org/html/draft-kasamatsu-bn-curves-02, which is hereby incorporated by reference in its entirety. For 254 bit BN curves, pairing parameters may be used as described by Aranha D. F., Fuentes-Castañeda L., Knapp E., Menezes A., Rodriguez-Henríquez F. (2013) Implementing Pairings at the 192-Bit Security Level. In: Abdalla M., Lange T. (eds) Pairing-Based Cryptography—Pairing 2012. Pairing 2012. Lecture Notes in Computer Science, vol 7708. Springer, Berlin, Heidelberg, which is hereby incorporated by reference in its entirety.

Setup generates Public Key=(g, h, H=h^β, e(g,h)^α) and Master Secret Key=(β,g^α). G1 is a subgroup of order q of a BN elliptic curve $E(F_p)$. G2 is a subgroup of order q of a sextic twist $E'(F_{p^2})$ of $E(F_p)$. GT is a subgroup of order q of $F_{p[<]BEGINITALm(12)}$. g is a generator of G1, and h is a generator of G2. α, β$\in_R$ {0, . . . , q-1}.

The Key Generation phase begins by specifying user attributes. Integer attributes must be additionally specified with the maximum number of bits used to represent their value, for example, "Trust level=4" is followed by a "#" symbol, and the maximum number of bits chosen to represent a trust level, for example 3 bits (permitting trust level values from 0 to 7). In this example, an attribute set may consist of: "Name=Teng", "Role=Manager", "Trust level=4 #3".

The Key Generation phase then proceeds to parsing the attributes. String attributes remain as they are, but integer attributes are converted into their bit representations. For example, "Trust level=4 #3" gets converted to "Trust level3_0=0", "Trust level3_1=0", and "Trust level3_2=1", representing the $0^{th}$, $1^{st}$, and $2^{nd}$ bit positions respectively. The parsed attribute set corresponding to the example above is: "Name=Teng", "Role=Manager", "Trust level3_0=0", "Trust_level3_1=0", "Trust_level3_2=1".

Once the attributed are parsed, the Key Generation phase proceeds to generate the keys. Private ABE keys are generated by the trusted third party which holds the Master Secret ABE Key (such as a key management system or a trusted execution environment). The private ABE keys are generated according to the following specification:

$$D = g^{\left\{\frac{a+r}{\beta}\right\}},$$

$D_y = g^r \cdot \text{Hash}(y)^{r_y}$ and $D_y' = h_y^r$, where $r \in_R$ {0, . . . , q-1}, y is the attribute string, and Hash is a cryptographic hash that maps to G1.

Generation of the private ABE keys can be implemented using the Fouque-Tibouchi method described by S. Scott, N. Sullivan, and C. Wood in *Hashing to Elliptic Curves—draft-irtf-cfrg-hash-to-curve*-03 (2019), available at https://tools.ietf.org/html/draft-irtf-cfrg-hash-to-curve-03#section-5.3.5, which is hereby incorporated by reference in its entirety. This approach is applicable to the elliptic curve described above.

An example set of private ABE keys corresponding to the example attribute above would be:

$$D = g^{\left\{\frac{\alpha+\beta}{r}\right\}},$$

$D_{(Name=Teng)} = g^r \cdot \text{Hash(Name=Teng)}^{r_{\{Name=Teng\}}}$, $D_{\{Role=Manager\}} = g^r \cdot \text{Hash(Role=Manager)}^{r_{\{Role=Manager\}}}$, $D_{\{Trust\_level3\_0=0\}} = g^r \cdot \text{Hash(TrustLevel3\_0=0)}^{r_{\{Trust\_level3\_0=0\}}}$, $D_{\{Trust\_level3\_1=0\}} = g^r \cdot \text{Hash(TrustLevel3\_1=0)}^{r_{\{Trust\_level3\_1=0\}}}$, and $D_{\{Trust\_level3\_2=1\}} = g^r \cdot \text{Hash(TrustLevel3\_2=1)}^{r_{\{Trust\_level3\_2=1\}}}$.

The Encryption phase begins by specifying the access policy. An example policy is: "(Role=Manager AND Trust level>=4) OR Name=Yin".

Integer attributes like trust level can be used along with the comparison operators like <, >, <=, >=, and =, which is facilitated by conversion into their bit representations. Policy conditions are combined using either AND, OR, or k-out-of-n (e.g., AND is 2-out-of-2, OR is 1-out-of-2).

The Encryption phase then proceeds to parse the access policy. The policy is converted into an Access Tree. Integer attributes are further broken down into their bit representations, and represented in the Access tree. This is required to represent inequalities, as noted above. All the attributes are in the leaves of the tree, and they contain only equality. Each node is given a unique index.

The Encryption phase then proceeds with encryption. Encryption proceeds as follows:

Let M be the message to encrypt. This must be a group element of GT.

Generate a secret "s" for the root node, a number chosen randomly from 0, . . . , q-1.

Use Shamir secret sharing (as described by Adi Shamir. 1979. How to share a secret. Commun. ACM 22, 11 (November 1979), 612-613. DOI: https://doi.org/10.1145/359168.359176, which is hereby incorporated by reference in its entirety) to generate secrets for the children of this node, using their unique indices. Do this recursively for all the nodes in the Access Tree. Let s_y denote the secret of a node y.

The ciphertext consists of the following: the Access Tree, and for each attribute string y in each leaf node, a ciphertext ($C_y=H^{s_y}$, $C_y'=Hash(y)^{s_y}$), where $C\sim=M.e(g, h)^{\alpha.s}$ and $C=H^{s_y}$.

The Decryption phase then begins at the receiver. Decryption is only possible if attributes in the Private ABE Key satisfy the policy, i.e. the Access Tree. If they do not, then it is computationally hard to obtain the original encrypted message, i.e. the encryption itself must be broken.

A node of the Access Tree is satisfied if the attribute string it contains has a matching parsed attribute string in the Private Key. In the above example, the node containing "Trust_level3_2=1" has a matching Private Key attribute, so it is satisfied.

Due to the Shamir secret sharing used during encryption, for each parent node in the tree, a certain threshold number of child nodes need to be satisfied in order for the parent node to be satisfied. It is possible to successfully decrypt only if the root node is satisfied.

Decryption starts with the leaf nodes of the tree. If a leaf node is satisfied, the following operations are performed:

$$\text{node\_value} = e(D_{Trust\_level3\_1=1}, C_{Trust\_level3\_1=1})/e$$
$$(C_{Trust\_level3\_1=1}', D_{Trust\_level3\_1=1}'),$$

First, the node value is raised to an exponent (roughly, this is the product of Lagrange coefficients of all the nodes in the path from the leaf node to the root node). The results of all the satisfied nodes are then multiplied: this product is designated A.

Second, a quotient is computed: $e(C,D)/A$. This quotient is equal to the "masking factor" $e(g, h)^{\alpha.s}$ in $C\sim=e(g, h)^{\alpha.s}$ M of the ciphertext. Removing this masking factor produces the original message M.

Modified BSW CP-ABE

As noted above, example embodiments described herein may use a modified version of the BSW CP-ABE technique described in the previous section.

A first modification to BSW CP-ABE used in some embodiments combines the asymmetric BSW CP-ABE encryption scheme with a second, symmetric encryption scheme such as Advanced Encryption Scheme (AES). The use of a symmetric encryption scheme may facilitate encryption of plaintexts, such as files. To combine AES with BSW CP-ABE, a random group element M of G1 is chosen, and passed through a key derivation function (KDF) to get an AES symmetric key. A file is encrypted using this key to generate a symmetric ciphertext. Next, the group element M is encrypted using CP-ABE (i.e., group element M is treated as message M in the ABE technique described above) to generate an asymmetric ciphertext. The asymmetric ciphertext and the symmetric ciphertext together constitute the encrypted form of the file (also referred to herein as the "encrypted file"). To decrypt, first the asymmetric ciphertext is decrypted to get M. The AES symmetric key used to encrypt the file is obtained by passing M through a KDF. The symmetric ciphertext can then be decrypted to generate the plaintext (i.e. unencrypted) file.

A second modification to BSW CP-ABE used in some embodiments requires a password to be supplied by the receiver in addition to the attributes satisfying the access policy in order to decrypt the file contents. This modification to BSW CP-ABE operates much like BSW CP-ABE described above, with the modifications described below.

The Setup phase, Encryption phase, and Decryption phase all proceed as in BSW CP-ABE. The Key Generation phase, however, is split into two operations: a sender side operation and a receiver side operation. In a first Key Generation operation, at the sender side, a password is selected by the sender (possibly based on information supplied by another source, such as the receiver). Note that, as described above, generation of the private ABE key in BSW CP-ABE requires that for each attribute, value) provided by the user, two group elements, D and D' be computed: $D=g^rH$(attribute, value)$^{r\_attribute}$, and $D'=g^{r\_attribute}$.

In the modified BSW CP-ABE using a password, these group elements are computed as follows: $D=g^rH$(attribute, value)$^{r\_attribute-G(password,(attribute,value))}$, and $D'=g^{r\_attribute}$. Typically, the password is known only to the sender and receiver. The private ABE key(s) generated at the sender are then sent to the receiver.

The second Key Generation operation then takes place at the receiver side. For the private ABE key to be usable for decryption, the receiver has to multiply D with H (attribute, value)$^{G(password\_v, (attribute\_v, value\_v))}$ to generate a modified version of the private ABE key, where G is a hash function that maps to the group size, i.e. any number between 0 and (group size −1). Password_v (i.e. a password string) is entered by the receiver, and (attribute_v, value_v) are obtained from an attribute source of the receiver, such as settings of a trusted file content viewer software application.

If (attribute_v, value_v) !=(attribute, value), or if password_v !=password, then G(attribute_v, value_v) !=G(attribute, value) with high confidence, and the computed modified private key on the receiver side will be incorrect. Thus, decryption will fail if the password is incorrect. In some embodiments described herein, the performance of the second key generation operation (i.e. generating modified versions of the private ABE keys by applying the attribute and password hash) and the decryption phase of CP-ABE may be jointly referred to as "decrypting" a ciphertext using the private ABE keys, attributes, and password.

Example embodiments described herein may use a version of BSW CP-ABE modified using one or both of the modifications described above. Further details of the ABE scheme used in a particular embodiment or example are discussed further with reference to the particular embodiments and examples below.

Granular Access Policy Enforcement Using ABE

CP-ABE (such as the modified BSW CP-ABE variants described above) may exhibit a number of advantages when used for access control. Access control is enforced cryptographically, instead of using programming logic such as if-statements. Malicious users cannot combine their respective private keys to decrypt a ciphertext encrypted using a policy that requires a combination of privileges or attributes. Furthermore, every user is given a private key based on the user's attributes: since the policy is embedded in the ciphertext, different private ABE keys need not be issued to allow decryption for different policies. Instead, a user needs a new private ABE key only when the user's attributes change.

Figure 4A:
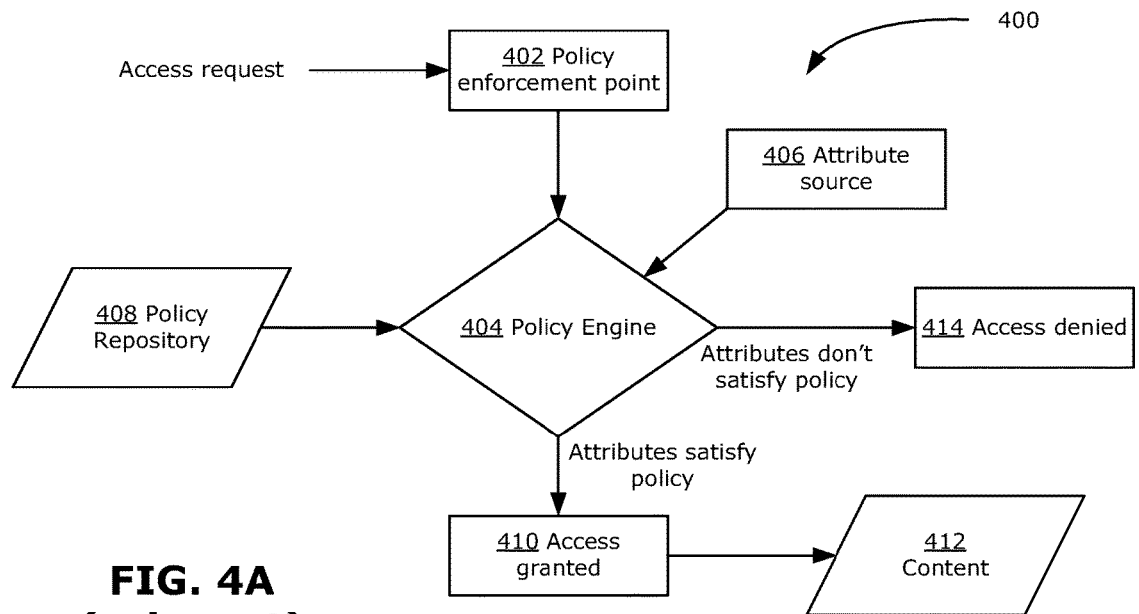
FIG. 4A is a system diagram showing an example access policy enforcement operation using a conventional policy engine.

FIG. 4A is a system diagram illustrating an example of an access policy enforcement operation 400 using a conventional software-based policy engine 404. The access policy enforcement operation 400 may be implemented on a computer or electronic device, or across multiple devices in communication with each other.

An access request is received by a policy enforcement point 402, such as a file system of an operating system. The access request may be generated, for example, when a user attempts to access the contents of a file stored in the file system using the user interface of a file browser software application. The policy enforcement point 402 provides the access request to a policy engine 404, including any necessary metadata associated with the access request indicating details of the user account, device identifier, type of access to the file being requested (which may be referred to herein as an "access action", e.g. whether the access request is a request to view, copy, modify, delete, or print the file or the contents of the file). Some or all of the metadata associated with the access request may be retrieved by the policy engine 404 from one or more attribute sources 406, such as a repository of user account details or the settings of the software application generating the access request. Typically, the attribute source 406 for a policy engine 404 is referred to a policy information point (PIP). The metadata associated with the access request may be considered the equivalent of "attributes" as the term is used in attribute-based encryption: for example, details of a user account may include attributes such as the name, security level, and role of the user.

The policy engine 404 may be a software module configured to enforce a file access policy stored in a policy repository 408. The access policy may be defined, for example, by a system administrator or by the operating system. The policy repository 408 may be a portion of the storage or memory of the device. Typically, the policy repository 408 and the attribute source 406 would be stored in a secure format or a secure portion of storage or memory to prevent malicious alteration. An access policy may define attribute or metadata values or ranges that are necessary for an access request to return a positive response, i.e. to result in access to the requested file contents. Thus, an example access policy may grant access to a given file only for user accounts having security level greater than 3 and a role of administrator, originating from a device ID that matches the local device where the file is stored. The policy may also limit access actions for such a request to the actions of "view", "copy", and "print".

If the attributes or other metadata satisfy the policy—e.g., in the example above, if the access request provides attribute values of (user account security level="5", user account role="administrator", device ID=[ID of local device], user account name="Alice", access action="print")—then access block 410 provides the file content 412 for printing. On the other hand, an access request with attributes that do not satisfy the access policy, e.g. an access request providing attribute values of (user account security level="6", user account role="administrator", device ID=[ID of local device], user account name="Bob", access action="modify"), will be denied by denial block 414, and the operating system may return an error message to the user or application initiating the access request indicating that the user account does not have permission to perform the requested access action on the requested file.

The example access policy enforcement operation 400 of FIG. 4A presents multiple potential attack surfaces for malicious unauthorized access attempts. The attribute source 406 can potentially be attacked to modify or substitute the attribute values supplied to the policy engine 404. The policy repository 408 can potentially be attacked to modify or substitute the access policy. The policy engine 404 can be attacked by software exploits seeking to undermine the logical operations of the software implementing the policy engine, causing the policy not to be enforced or returning a positive (i.e. "access granted") result for a non-compliant access request. The file content 412 may also be intercepted or misused when it is provided to the requesting user or application, or it may be accessed without authorization if it is ever stored or communicated in unencrypted form.

Example methods and devices described herein may minimize the attack surfaces available for malicious unauthorized access attempts while providing granular access control for file contents shared peer-to-peer. By using a modified form of BSW CP-ABE (BSW CP-ABE being described in detail above, with modifications as described below), the described embodiments may limit unauthorized access attempts to attacks which break encryption.

Figure 4B:
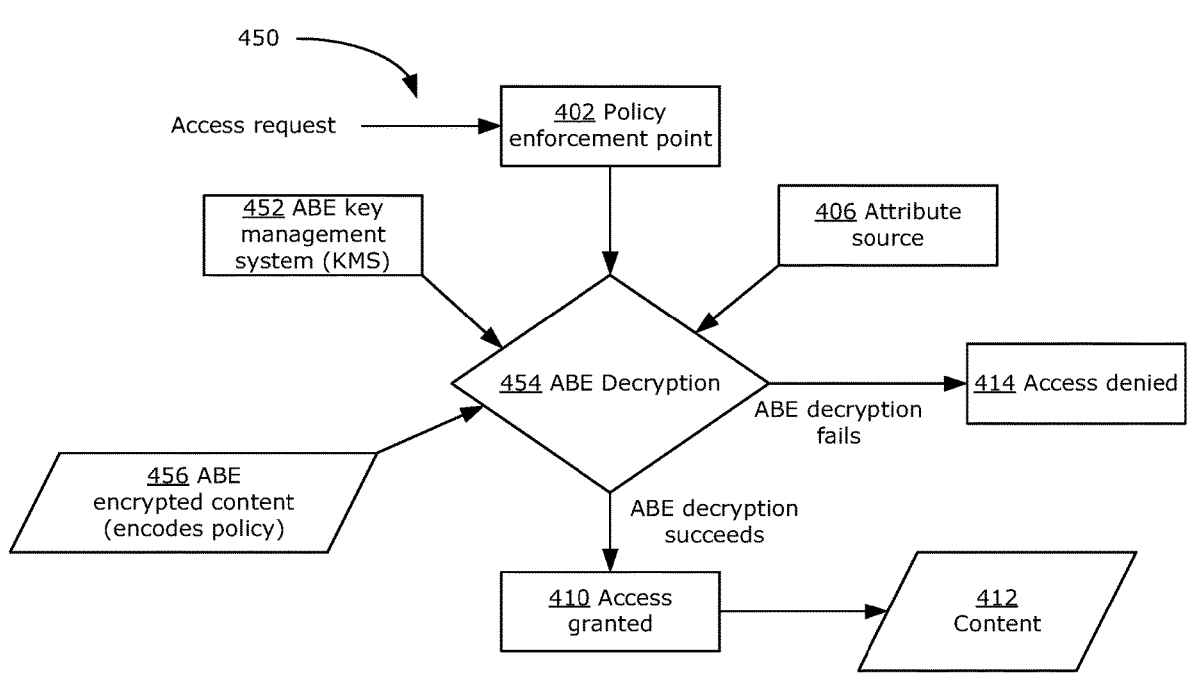
FIG. 4B is a system diagram showing an example ABE access policy enforcement operation using attribute-based encryption (ABE) to enforce the access policy.

FIG. 4B is a system diagram illustrating an example of an ABE access policy enforcement operation 450 using ABE, such as BSW CP-ABE or a modified version thereof as further described below. The ABE access policy enforcement operation 450 may be implemented on a computer or electronic device, or across multiple devices in communication with each other, as will be further described below with reference to example embodiments and example contexts in which the described embodiments may be used.

As in the access policy enforcement operation 400 of FIG. 4A, an access request is received by a policy enforcement point 402. In the ABE access policy enforcement operation 450, the policy enforcement point 402 provides the access request to an ABE decryption block 454. As in the access policy enforcement operation 400 of FIG. 4A, an attribute source 406 is used to supply the attributed associated with the access request. An ABE key management system (KMS) 452 supplies the private ABE key(s) to be used in ABE decryption by the ABE decryption block 454. The file content itself is stored as ABE encrypted file content 456, which effectively encodes the access policy in the encryption as described in the Attribute Based Encryption section above.

The ABE decryption block 454 receives at least one private ABE key from the ABE key management system (KMS) 452 and uses the attribute values provided by the attribute source 406 to generate a modified version of the received private ABE key. The modified private ABE key is used by the ABE decryption block 454 to decrypt the ABE encrypted file content 456.

If the decryption succeeds, then access block 410 provides the file content 412 to the requesting user or application for the requested access action. If the decryption fails, then denial block 414 may be used to return an error indicating lack of authorization.

In example embodiments described herein, the vulnerability of the attribute source 406 and the content 412 may be minimized by using a trusted viewer application (e.g. a cryptographically signed binary executable file) to directly receive and handle the decrypted file contents 412 from the ABE decryption block 454, and to act as an attribute source 406 by supplying trusted values for attributes related to the access actions enabled by the trusted viewer. Furthermore, the file contents 412 are protected against attack prior to the ABE decryption operation, as they are stored in ABE encrypted form as ABE encrypted file content 456.

The vulnerabilities of the policy engine 404 of method 400 in FIG. 4A are not present in the ABE access policy enforcement operation 450, as there is no software logic to be exploited or undermined—the policy is cryptographically enforced, requiring an attacker to break the encryption scheme itself to gain access to the ABE encrypted file content 456.

Peer-to-Peer Secure Granular Access Control Using Modified BSW CP-ABE

In a peer-to-peer (P2P) scenario, CP-ABE may exhibit advantages over symmetric-key based solutions for several reasons. First, for an attribute where the receiver's attributes change over time (such as the number of attempts the receiver device has made to open the encrypted file), a new symmetric key, as well as a new ciphertext encrypted with this key, need to be issued to the receiver every time an attribute changes. In comparison, CP-ABE requires only the private key to be re-issued—the ciphertext (i.e. the encrypted file) remains unchanged, and an additional encryption step is not needed. Furthermore, in CP-ABE, the new private key to be issued can be derived from the old private key in some cases, which simplifies key management.

Consider the following problematic scenario. In this example, the sender verifies the receiver's attributes before generating and sending the private key, and at least some of the receiver attributes are supplied by a viewer application of the receiver device. However, it may be possible for an attacker to obtain a private key corresponding to a policy (attribute,value) pair ("Screenshot"="Not allowed"), and later maliciously change the viewer application settings to enable screenshots. In such a case, the receiver will succeed in decrypting a file that does not allow screenshots in its policy, but will still be able to take screenshots.

One way to enforce such attributes is by performing a check in software to confirm that the viewer settings satisfy the access policy before decrypting the ciphertext. However, such checks can potentially be bypassed, even if the viewer application is a trusted viewer application with logic that cannot be compromised.

Another solution is to verify a message authentication code (MAC) or the viewer application's cryptographic signature, but this may requires additional keys and/or computation.

The third solution, which is used in some embodiments described herein, is to use the modified CP-ABE scheme described above, which enforces viewer application settings (such as "No screenshots of file content can be taken" or "File content cannot be saved") using ABE itself. This ensures that decryption will fail if the viewer application has the wrong settings. This is potentially more secure than using programming logic such as if-statements, or using a MAC or other hardware identifier to check if the viewer application settings match the settings specified in the access policy encoded in the ciphertext.

ABE-based peer-to-peer examples will now be described in detail, as well as similar embodiments adapted to use a network server or cloud computing platform (e.g. server 110) to enable and extend certain features. Group sharing is also possible using similar configurations, as described with reference to further examples below. The described embodiments potentially provide an extensible platform to support many different usage scenarios.

Figure 5:
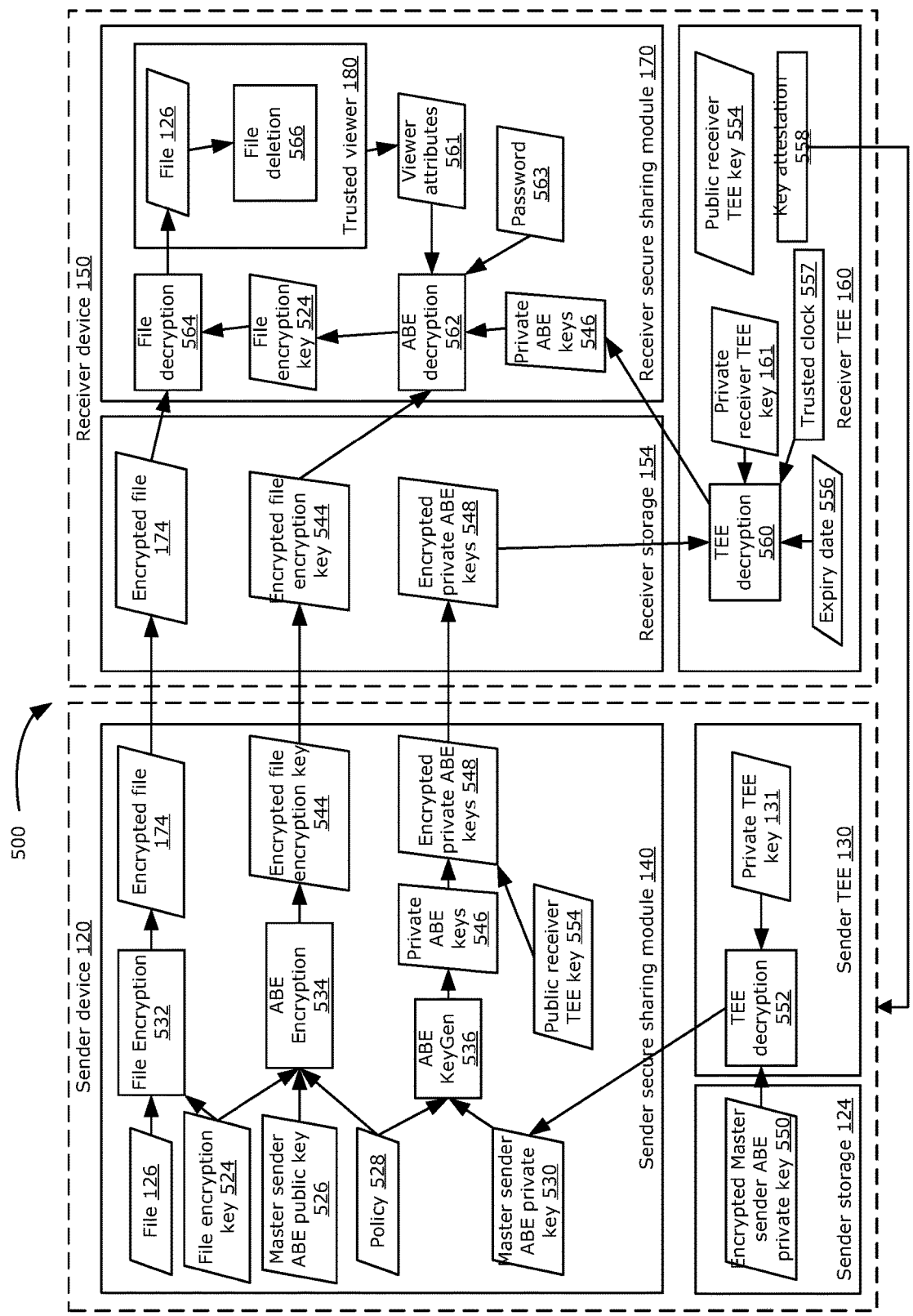
FIG. 5 is a system diagram showing the operations of an example system for secure data sharing using a sender device and receiver device, in accordance with examples described herein.
Figure 6:
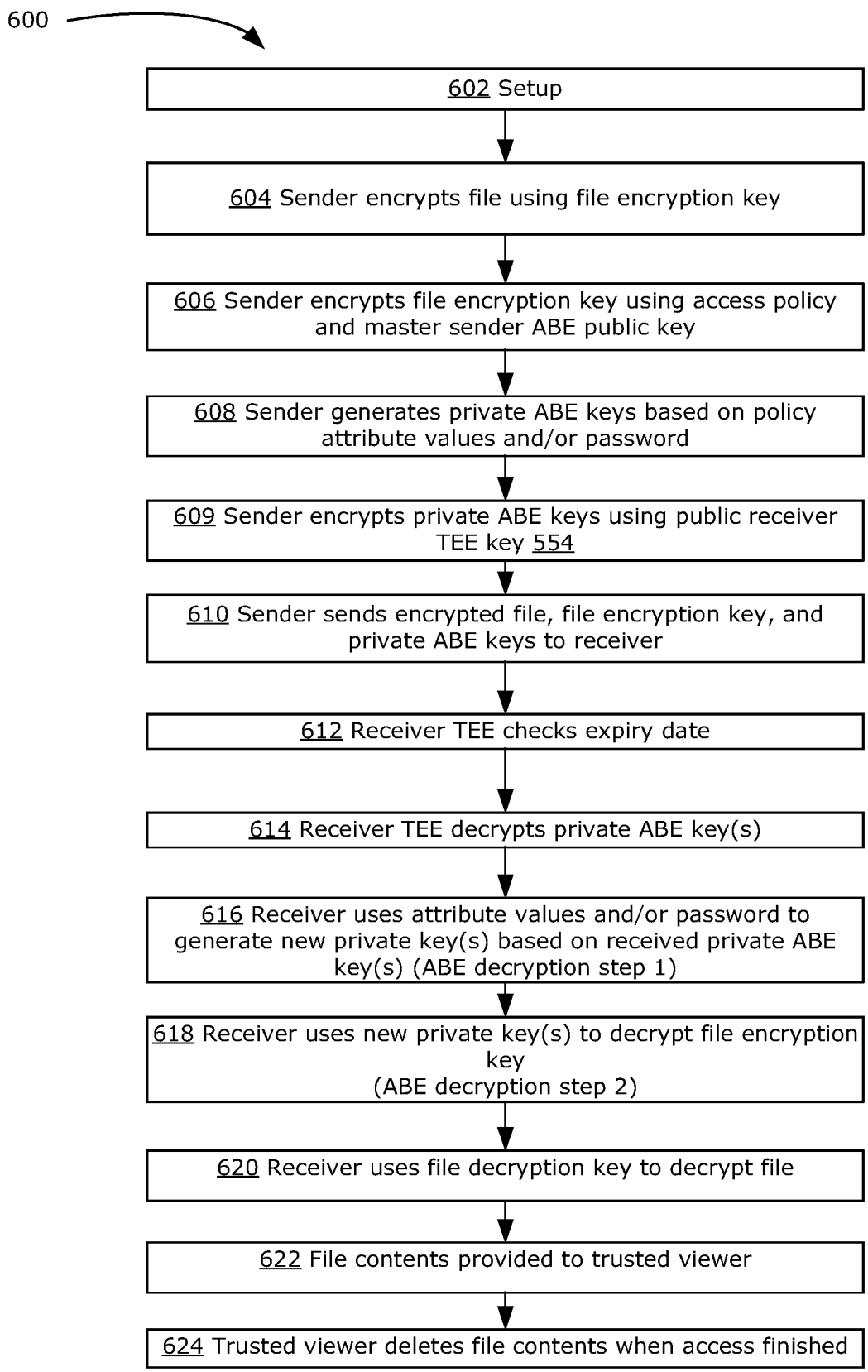
FIG. 6 is a flowchart illustrating the steps of an example method for secure data sharing as implemented by the system of FIG. 5.
Figure 7:
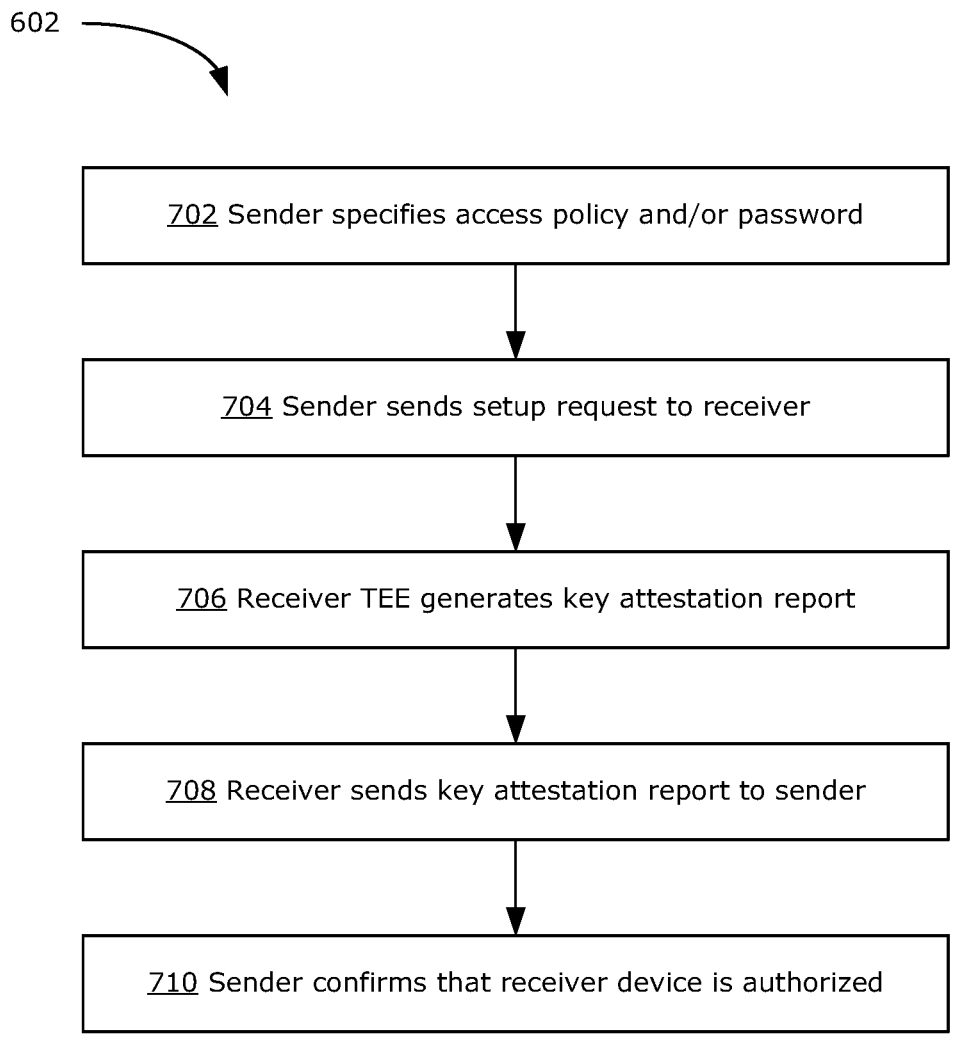
FIG. 7 is a flowchart illustrating example sub-steps of the setup step of the example method of FIG. 6.

Example embodiments will now be described with joint reference to FIG. 5, FIG. 6, and FIG. 7. FIG. 5 shows a system diagram of an example system 500 for secure data sharing using a sender device 120 and receiver device 150. FIG. 6 is a flowchart illustrating the steps of an example method for secure data sharing as implemented by the system 500 of FIG. 5. FIG. 7 is a flowchart illustrating example sub-steps of the setup step of the example method of FIG. 6.

The system 500 implements modified BSW CP-ABE using AES as a symmetric encryption scheme in combination with ABE and using a password to further secure the file content, as described above. It will be appreciated that some embodiments may omit or vary one or both of these modifications, or may use a different ABE variant other than BSW CP-ABE, while achieving the other described features of the system 500.

As described above with reference to FIG. 2-3, the sender device 120 and receiver device 150 both include trusted execution environments: a sender TEE 130 and receiver TEE 160, respectively. The sender TEE 130 is used to protect a master sender ABE private key 530 from sender-side attacks seeking to undermine the secure sharing operations of the system 500. This is accomplished by storing the master sender ABE private key 530 in sender storage 124 as an encrypted master sender ABE private key 550, which can only be decrypted by the sender TEE 130 using a private TEE key 131 stored securely in the sender TEE 130. During the first, sender-side operation of the Key Generation phase, the sender TEE performs a TEE decryption operation 552 using the private TEE key 131 to provide the decrypted master sender ABE private key 530 to the sender secure sharing module 140. The receiver TEE 160 performs a number of operations in some embodiments, as described in further detail below.

The sender device 120 and receiver device 150 include a sender secure sharing module 140 and receiver secure sharing module 170, respectively, as described above with reference to FIGS. 2-3. In some embodiments, these modules 140, 170 are trusted software applications signed cryptographically by a trusted authority.

The method 600 shown in the flowchart of FIG. 6 sets out the steps for performing a method for peer-to-peer secure sharing of a file (or other data object) using a secure sharing system such as system 500. At 602, the setup phase of modified BSW CP-ABE is performed, as described above. The setup step 602 may in some embodiments include one or more additional operations, as shown in the flowchart of FIG. 7, which provides further sub-steps of the setup step 602.

With reference to FIG. 7, at 702 the sender device 120 specifies the access policy 528 for a file 126. The sender device 120 may also optionally define a password 563, as described above.

The access policy includes one or more attribute configurations, each attribute configuration comprising a plurality of attribute values authorizing access to the contents of the file 126. An example access policy could include attributes or configurations indicating: the maximum number of times the file may be opened; the user account of the user making the access request; the device identifier of the device making the access request; other attributes pertaining to the entity making the access request; whether screenshots are permitted; whether viewing the file is permitted; whether saving the file is permitted; whether copying the file or its contents is permitted; whether forwarding the file is permitted; whether printing the file contents is permitted; other attributes pertaining to the nature of the requested access action; the identifier of a specific datum to which access is being requested, the datum being contained within the file; and any other attributes as will be appreciated. The access policy 528 may optionally also include an expiry date for a permission of the receiver device 150 to access the file. Finally, as discussed in greater detail below, the access policy 528 may in some embodiments also enable certain active access At 704, the sender device 120 sends a setup request to the receiver device 150. The setup request includes the access policy 528 defined at step 702.

At 706, in response to receiving the setup request, the receiver device 150 generates a key attestation report 558. The receiver device 150 uses the receiver TEE 160 to generate the public receiver TEE key 554 and the private receiver TEE key 161. The private receiver TEE key 161 is stored in the receiver TEE 160 for use during the decryption phase. The key attestation report 558 includes a copy of the public receiver TEE key 554. If the access policy 528 includes an expiry date, the key attestation report 558 may also include a confirmation of the expiry date. The key attestation report 558 may include other information in some embodiments, such as a device identifier for the receiver device 150 allowing the sender device 120 to confirm that the receiver device 150 is compliant or authorized. The receiver device 150 may also record details of the access policy 528. For example, if the access policy 528 includes an expiry date 556, the expiry date 556 is recorded within the receiver TEE 160 for future enforcement of the expiry date 556 as described below.

At 708, the receiver device 150 sends the key attestation report 558 to the sender device 120.

At 710, the sender device 120 confirms that the receiver device 150 is compliant or authorized. This may be accomplished, in some embodiments, by confirming that the device identifier of the receiver device 150 matches a list of devices with an authorized (e.g. cryptographically signed) trusted viewer application 180 and/or receiver secure sharing module 170. At this step 710, the sender device 120 may also use the device identifier to identify capabilities in incapacities of the receiver device 150 to comply with various aspects of the secure sharing scheme. For example, in some embodiments the sender device 120 may be able to use the device identifier to identify that the receiver device 150 is a device that does not enable text input (e.g. an IoT device), and that therefore a password cannot be used to secure files sent to the receiver device 150. In some such embodiments, the sender may specify an access policy wherein the device identifier or a non-text input such as a scanned QR code may be used in place of a password. It will be appreciated that other capabilities or limitations of the receiver device 150 may be identified by the server device 120 based on the device identifier provided as part of the key attestation report 558.

Returning to FIG. 6, the sender device 120 then proceeds to the encryption phase. At 604, the sender device 120 encrypts the file 126 using a file encryption key 524, which may be an AES key or other symmetric key in some embodiments, shown in FIG. 5 as file encryption operation 532. This operation 532 generates encrypted file 174.

At 606, the sender device 120 encrypts the file encryption key 524. The access policy 528 and master sender ABE public key 526 (i.e. the Master Public ABE Key used by the sender) are used by an ABE encryption operation 534 to perform the Encryption phase of modified BSW CP-ABE as described above, thereby generating an encrypted file encryption key 544. The master sender ABE public key 526 is locally stored or generated at the sender device 120 based on the access policy 528, as described above. In embodiments using a password 563, the password may be included in the access policy 528 and therefore encoded into the ABE ciphertext (i.e. the encrypted file encryption key 544).

At 608, the sender device 120 generates the private ABE keys 546. An ABE KeyGen operation 536 generates the private ABE keys 546 using the master sender ABE private key 530 (i.e. the Master Private ABE Key used by the sender, which is decrypted by the sender TEE 130 as described above). The private ABE keys 546 are generated based on policy attribute values and/or the password 563, as described above. In some embodiments, the set of private ABE keys 546 may include a plurality of private ABE keys, each private ABE key corresponding to an attribute configuration (i.e. a set of attribute values that satisfies the access policy 528).

At 609, the sender device 120 encrypts the set of private ABE keys 546 using the public receiver TEE key 554 received as part of the key attestation report 558, thereby generating an encrypted set of private ABE keys 548.

It will be appreciated that steps 604, 606, 608, and 609 may be performed in a different order in other embodiments.

At 610, the sender device 120 sends the encrypted file 174, encrypted file encryption key 544, and encrypted private ABE keys 548 to the receiver device 150. The received encrypted file 174, encrypted file encryption key 544, and encrypted private ABE keys 548 may be stored by the receiver device 150 upon receipt, for example in receiver local storage 154.

At 612, if the access policy 528 includes an expiry date 556 for the receiver's access to the file 126, a TEE decryption operation 560 of the receiver TEE 160 determines whether the expiry date has been reached. The receiver TEE 160 compares the current time and date according to a trusted clock 557 to the expiry date 556 included in the access policy 528.

At 614, if the expiry date 556 has not been reached or if the access policy 528 does not define an expiry date 556, the TEE decryption operation 560 of the receiver TEE 160 applies the private receiver TEE key 161 to decrypt the encrypted set of private ABE keys 548, thereby generating the original, decrypted set of private ABE keys 546. At least one of these private ABE keys 546 is provided by the receiver TEE 160 directly to the receiver secure sharing module 170.

In some examples, the access policy 528 may include an attribute indicating the number of times the file 126 has been opened at the receiver device 150. In some embodiments, the receiver TEE 160 may be used to track the number of times the file 126 has been opened by the receiver device 150 and only provide a private ABE key to the receiver device 150 if the current number of open attempts satisfies the access policy 528. The receiver TEE 160 may use a counter to track the number of times the receiver device 150 has requested access to the file 126. Each time the receiver device 150 requests access to the file 126, the current counter value N is compared to a corresponding attribute value specified in the access policy 528. If the counter value N matches a permitted attribute value for the number of file access requests, then a corresponding individual private key of the set of private ABE keys 546 is provided to the receiver secure sharing module 170. Thus, in a first example embodiment, each private ABE key corresponds to a set of attribute values that satisfies the access policy, and the attribute indicating the number of times a file may be opened has three possible values: "up to 5 times", "up to 10 times", and "up to 20 times". The value of the attribute "open attempts" could be an integer index to a table of corresponding ranges, e.g. 0="up to 5 times", 1="up to 10 times", 2="up to 20 times". (It will be appreciated that other implementations are possible, including a string value for the attribute, or an integer value indicating the exact number of open attempts permitted.) In an example use case using this embodiment, an access policy 528 is received by the receiver device 150 permitting up to 10 file open attempts. The set of private ABE keys 546 would therefore include a first key corresponding to "up to 5 times" (e.g. the integer index attribute value for "open attempts" must be lower than 1, i.e. each bit must be=0) and a second key corresponding to "up to 10 times" (e.g. the integer index attribute value for "open attempts" must be lower than 2, i.e. the second bit must be=0). Each time the receiver TEE 160 receives a request by the receiver device 150 to open the file, the current counter value N is checked against the access policy 528, and if a corresponding private ABE key exists, then that individual key is provided to the receiver secure sharing module 170. The counter is then incremented (N=N+1). Thus, on the third file open attempt, the counter value is checked (N=3), the access policy 528 is checked (3<=5→"up to 5"), and the first private ABE key ("open attempts" bit 1=0, "open attempts" bit 2=0,) is provided to the receiver secure sharing module 170 along with corresponding attribute values ("open attempts" bit 1=0, "open attempts" bit 2=0). Alternatively, the scheme may rely entirely on the receiver TEE 160 to enforce the "open attempts" attribute, and this attribute may be omitted from the ABE encryption altogether.

In other embodiments, the selection between multiple keys corresponding to changing receiver attributes may be performed outside of the receiver TEE 160, such as in logic of the receiver secure sharing module 170 or elsewhere. However, performing this check within the receiver TEE 160 may result in greater security.

At 616, the receiver device 150 uses attribute values and/or the password 563 to generate modified private key(s) based on the received decrypted private ABE key(s) 546. This step 616 constitutes a first step of ABE decryption, which is equivalent to the second, receiver-side operation of the Key Generation phase of modified BSW CP-ABE described above. The attribute values are received from one or more attribute sources, such as a set of viewer attributes 561 provided by the trusted viewer application 180. Other attribute sources may include, for example, an operating system of the receiver device 150 providing user attributes for the user account requesting access to the file 126. The password 563 may be entered by a user, such as via an input device 164, or it may be provided by another source (e.g. a software application such as a password manager). An ABE decryption operation 562 applies the (attribute, value) pairs and the password (if any) to generate the modified private key(s), as described above: i.e., each D is multiplied with a corresponding H (attribute, value)$^{G(password\_v,\ (attribute\_v, value\_v))}$ to generate the modified private key(s).

At 618, the receiver device 150 uses the modified private key(s) to decrypt the encrypted file encryption key 544. This step 618 constitutes a second step of ABE decryption, which is equivalent to the Decryption phase of modified BSW CP-ABE described above. The ABE decryption operation 562 uses one of the modified private keys to decrypt the encrypted file encryption key 544, thereby generating the decrypted file encryption key 524.

The identification of the correct private ABE key may be performed differently in different embodiments. In some embodiments, the ABE decryption operation 562 receives multiple private ABE keys at step 616, generates multiple corresponding modified private keys, and attempts to decrypt the encrypted file encryption key 544 with each modified private key in turn until one succeeds. Other embodiments may include a mechanism for identifying the correct private ABE key without the need for trial and error. Some embodiments may identify the correct private ABE key within the receiver TEE 160 using the stored access policy 528 as a reference; the receiver TEE 160 then supplies only the correctly identified private ABE key to the receiver secure sharing module 170. Other embodiments may perform the identification within the receiver secure sharing module 170. In some embodiments, the sender device 120 may provide metadata identifying the different private ABE keys; such metadata may, for example, be attached to the encrypted private ABE keys 548 when they are sent to the receiver device 150. The metadata may be digitally signed or otherwise integrity-protected.

At 620, the receiver device 150 uses the decrypted file encryption key 524 to decrypt the encrypted file 174. As described above, the file encryption key 524 may be a symmetric key such as an AES key, and the file decryption operation 564 may perform conventional AES decryption to recover the plaintext file 126 from the encrypted file 174 by applying the file encryption key 524.

At 622, the contents of the decrypted file 126 are provided to the trusted viewer application 180. The trusted viewer 180 is then able to perform the access action(s) for which it has been authorized, using the trusted viewer settings provided as viewer attributes 561. For example, the file 126 may be made available to a user to view, print, take screenshots, copy, or save, as indicated by the access policy 528 and the trusted viewer settings.

At 624, a file deletion operation 566 of the trusted viewer 180 may delete the received plaintext file 126 and all of its contents stored in memory once the access is finished (e.g. after a user has closed the viewer or performed the access action, e.g. printing the file contents). In some embodiments, all copies of the plaintext file 126 and/or its contents, as well as any decryption keys decrypted during the access operation described above, will be deleted once they have been used. Thus, the file encryption key 524 may be deleted by the receiver secure sharing module 170 immediately after it is used to decrypt the encrypted file 174.

It will be appreciated that each operation shown within the sender secure sharing module 140 and receiver secure sharing module 170 may be implemented by executable instructions stored within the storage of the respective device. Thus, the sender instructions 138 may include instructions for implementing the file encryption operation 532, ABE encryption operation 534, ABE KeyGen operation 536, and other sender-side operations shown in FIG. 5, and that these instructions may be part of the instructions implementing the sender secure sharing module 140. Similarly, the receiver instructions 168 may include instructions for implementing the file decryption operation 564, ABE decryption operation 562, and other receiver-side operations shown in FIG. 5, and that these instructions may be part of the instructions implementing the receiver secure sharing module 170.

Cloud Server for Active Access Policy Options

The peer-to-peer secure sharing system 500 described above may in some embodiments include active access options among its access policy settings. These active access options are access policy settings that require the receiver device 150 to contact the sender device 120 at the time of the access action. Some embodiments may allow the access policy 528 to be configured to require the receiver device 150 to notify the sender device 120 at the time of the access action, with access only granted once the notification has been successfully delivered. The access policy 528 may further specify that certain access actions require notification, while others do not—for example, an access policy may require notification whenever a file is opened, or only when a screenshot is taken. Some embodiments may allow the access policy 528 to be configured to permit the sender device 120 to revoke the access policy 528, and/or to substitute a new access policy that supplants the previous access policy. Each of these active access options may be implemented using a peer-to-peer configuration such as that of system 500; however, this may limit file access at the receiver device 150 to times when the sender device 120 is reachable for receiving notifications, or it may allow attackers to circumvent the access policy revocation feature by disabling communications at the receiver device 150.

Some embodiments may therefore use a server, such as server 110 (which may be a network or cloud server or platform), to enable always-available active access features of an access policy 528. This server or platform may be referred to as a "dynamic policy server", and an access policy having one or more active access options enabled may be referred to as a "dynamic policy". The server 110 may be configured to receive notifications on behalf of the sender device 120 and relay the notifications to the sender device 120 when it becomes available. The server 110 may also relay access policy revocation messages from the sender device 120 to the receiver device 150 when the receiver device becomes available.

Figure 12:
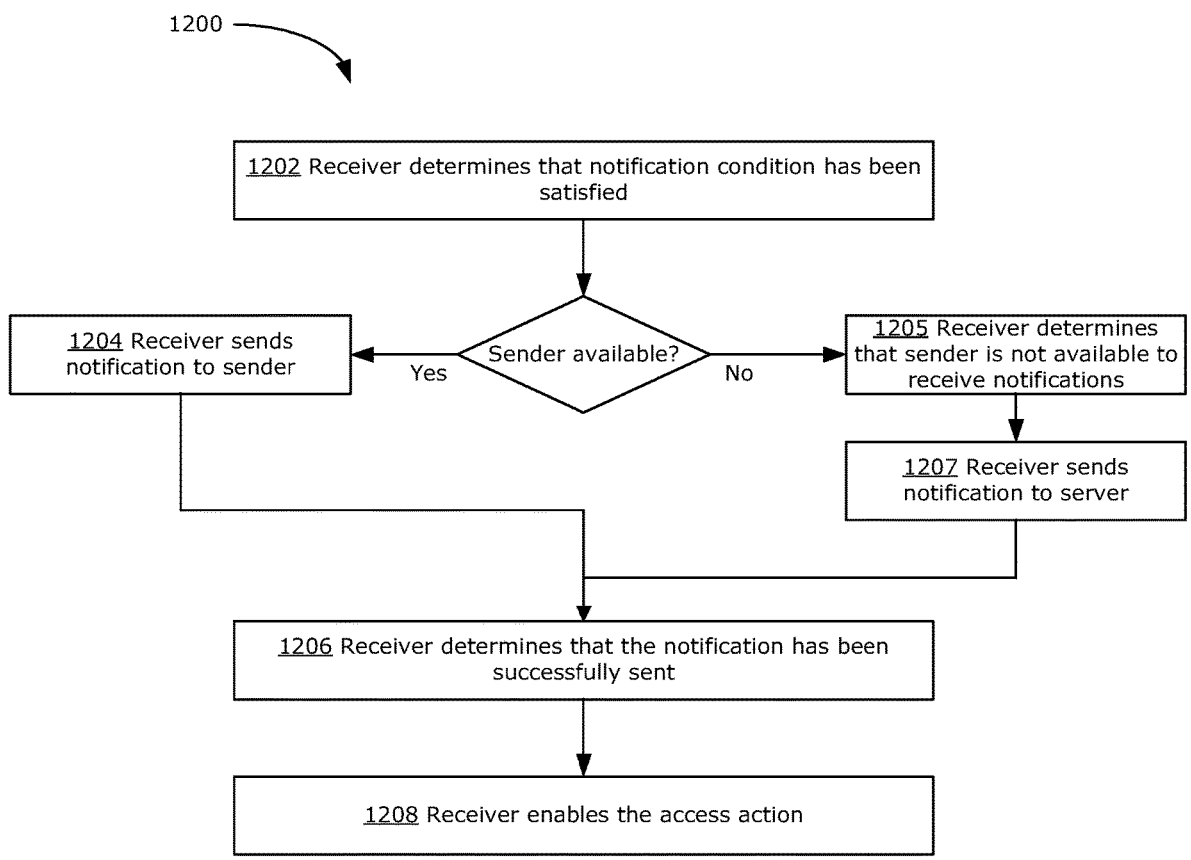
FIG. 12 is a flowchart illustrating the steps of an example method for secure sharing with sender notifications enabled, in accordance with examples described herein.

FIG. 12 shows an example method 1200 for sending notifications required by an access policy. At 1202, the receiver device 150 determines that a notification condition has been satisfied. The notification condition may be included in the access policy 528, associating the notification condition with one or more access actions (e.g. open, print, screenshot). In response to determining that the notification condition has been satisfied, the receiver device 150 attempts to send a notification to the sender device 120, the notification identifying the access action being attempted or requested.

If the sender is available to receive the notification, the method 1200 proceeds to 1204: the receiver device 150 sends the notification directly to the sender device 120.

If the sender is not available to receive the notification, the method 1200 instead proceeds to 1205: the receiver device 150 determines that the sender device 120 is not available to receive the notification. In this case, the method 1200 proceeds to step 1207, wherein the receiver device 150 instead sends the notification to the server 110.

Once the notification has been successfully sent at step 1204 or 1207, the method 1200 proceeds to step 1206, wherein the receiver device determines that the notification has been successfully sent. In some embodiments, the sender device 120 and/or server 110 may confirm that the notification has been received by sending a confirmation to the receiver device 150.

At 1208, in response to determining that the notification has been successfully sent, the receiver device enables the access action. In some embodiments, this may mean that the receiver TEE 160 provides the private ABE key(s) 546 to the receiver secure sharing module 170 only at step 1208. In other embodiments, the notification method 1200 is implemented entirely within the logic of the receiver secure sharing module 170, or by a separate module.

Some embodiments may always use the server 110 to mediate the sending and confirmation of notification for notification method 1200, regardless of whether the sender device 120 is reachable.

Figure 13A:
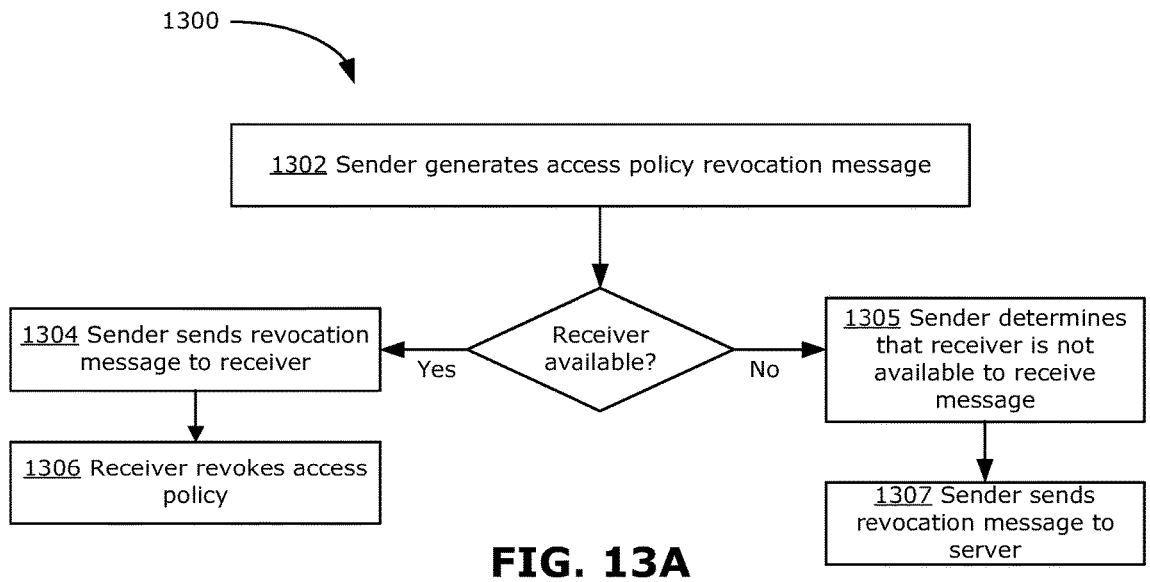
FIG. 13A is a flowchart illustrating the steps of an example sender-side method for revoking an access policy, in accordance with examples described herein.

FIG. 13A shows an example sender-side method 1300 for revoking an access policy. At 1302, the sender device 120 generates an access policy revocation message. The access policy revocation message is intended to revoke the permissions granted to the receiver device 150 to access the file 126 under the access policy 528. The access policy revocation message may be accompanied in some embodiments or in some use cases with a new access policy 528 setting out a different set of permissions.

If the receiver device 150 is available to receive the access policy revocation message, the method 1300 proceeds to step 1304; otherwise, it proceeds to step 1305.

At 1304, the sender device 120 sends the access policy revocation message to the receiver device 150.

At 1306, the receiver device revokes the access policy 528. In some embodiments, this may mean that the receiver device 150 deletes one or more of the encrypted file 174, encrypted file encryption key 544, and/or the encrypted private ABE keys 548. Some embodiments may implement revocation of the access policy within the receiver TEE 160, for example by configuring the receiver TEE 160 to refuse to decrypt the private ABE access keys 548 for the revoked access policy 528. Some embodiments may implement the revocation feature by updating the expiry date 556 stored within the receiver TEE 160 such that the access policy 528 expires at some time in the past (i.e. immediately) or in the future.

At 1305, the sender device determines that the receiver device 150 is not available to receive the access policy revocation message, for example because the receiver device 150 cannot be reached over the network 105.

At 1307, in response to determining that the receiver device 150 is unavailable, the sender device 120 sends the access policy revocation message to the server 110. The completion of the access policy revocation then occurs on the receiver side via method 1350, shown in FIG. 13B and described below.

Figure 13B:
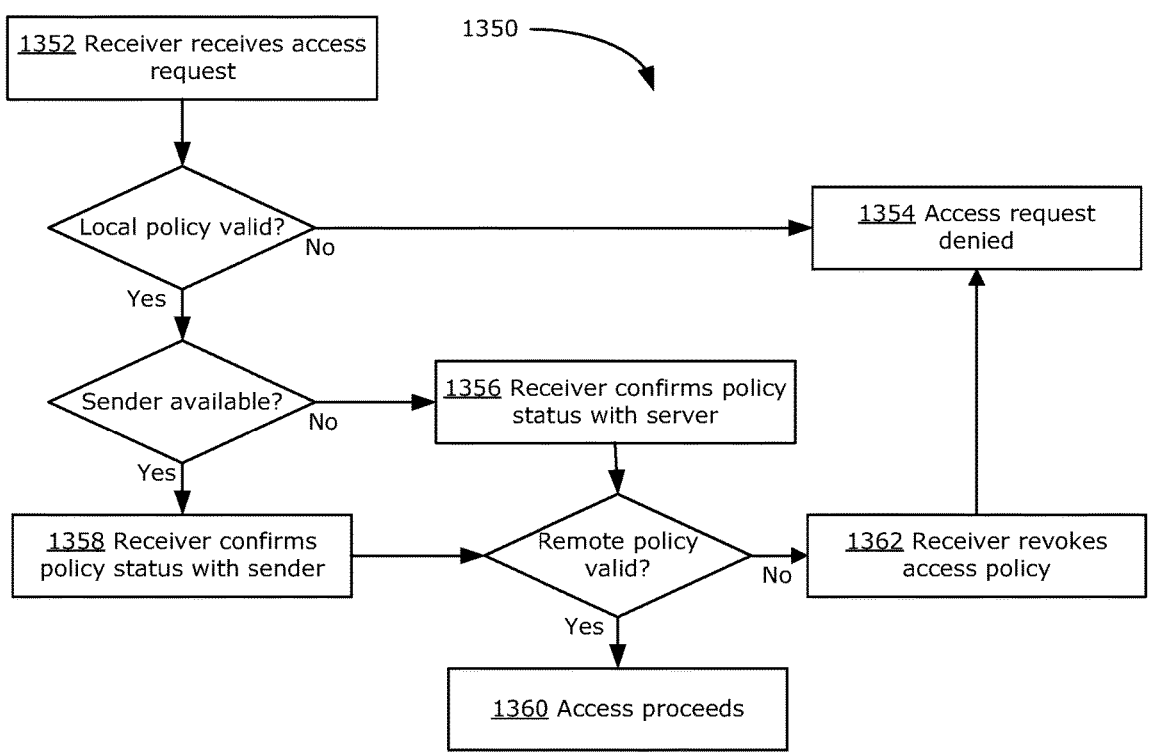
FIG. 13B is a flowchart illustrating the steps of an example receiver-side method for revoking an access policy, in accordance with examples described herein.

FIG. 13B shows an example receiver-side method 1350 for revoking an access policy. At 1352, the receiver device 150 receives an access request to access the contents of the file 126, e.g. from a user account or software application. The receiver device 150 checks the locally stored access policy 528 to determine if it has already been revoked (e.g. by step 1306 of method 1300). If the policy has been revoked and is therefore no longer valid, the method 1350 proceeds to step 1354. If the policy is still valid, the method 1350 proceeds to check if the sender device 120 is available (e.g. reachable via the network 105). If the sender is unavailable, the method 1350 proceeds to step 1356. If the sender is available the method 1350 proceeds to step 1358.

At 1354, in response to the determination that the local access policy 528 is invalid, the receiver device 150 denies the access request. In some embodiments, this may prompt the receiver device 150 to initiate a new setup request to the sender device 120, as described above with reference to method 600 in FIG. 6.

At 1356, in response to the determination that the sender device 120 is unavailable, the receiver device 150 contacts the server 110 to confirm the status of the access policy 528. At 1358, in response to the determination that the sender device 120 is available, the receiver device 150 contacts the sender device 120 to confirm the status of the access policy 528. Contacting the sender device 120 or the server 110 may involve a policy confirmation request being sent by the receiver device 150, and a policy confirmation being returned to the receiver device indicating the validity or invalidity of the access policy.

If the confirmation of the status of the access policy 528 results in a determination that the access policy 528 is still valid (i.e. has not been revoked), then the method 1350 proceeds to step 1360: the access request proceeds as normal (e.g. according to method 600).

If the confirmation of the status of the access policy 528 results in a determination that the access policy 528 is invalid (i.e. has been revoked), then the method 1350 proceeds to step 1362: the receiver device 150 revokes the access policy 528, as described above with reference to step 1306 of method 1300. The method 1350 then proceeds to step 1354: the access request is denied.

In various embodiments of methods 1300 and 1350, it will be appreciated that the various steps may be performed by the sender secure sharing module 140, receiver secure sharing module 170, or receiver TEE 160 as appropriate. It will also be appreciated that the methods 1300 and/or 1350 may be simplified in some embodiments: for example, some embodiments or some access policy configurations may use a dynamic policy server to mediate all policy revocation communications between the sender device 120 and receiver device 150, thereby eliminating steps such as 1304 and 1358 and requiring the receiver device 150 to contact the dynamic policy server each time the receiver device 150 receives an access request. To put it another way, some embodiments in which direct communication between the sender device 120 and receiver device 150 may essentially treat the sender device 120 as a stand-in for a dynamic policy server.

Other active access options for a dynamic access policy are possible in some embodiments. Notifications may be required under various conditions, including conditions based on the access action (view, screenshot, etc.), conditions based on the user making the request, or any other attribute or set of attributes. Policy revocation may be enabled, and some embodiments may allow the access policy to select from multiple options for how revocation operates (e.g. any of the variants mentioned above may be available for selection within a single embodiment). It will be appreciated that other active access options are possible using the methods, systems and devices described herein.

Additional examples of methods and systems using the modified ABE techniques described above for secure file sharing with granular access control will now be described.

The systems described below may refer to sensitive information being encrypted "using ABE". It will be appreciated that this may mean that at least some embodiments encrypt the sensitive data itself using e.g. AES or another symmetric encryption scheme, with the AES key encrypted using ABE and sent along with the encrypted sensitive data, as described with reference to system 500 above.

Controlled Sharing of Smart Home Data

Figure 8:
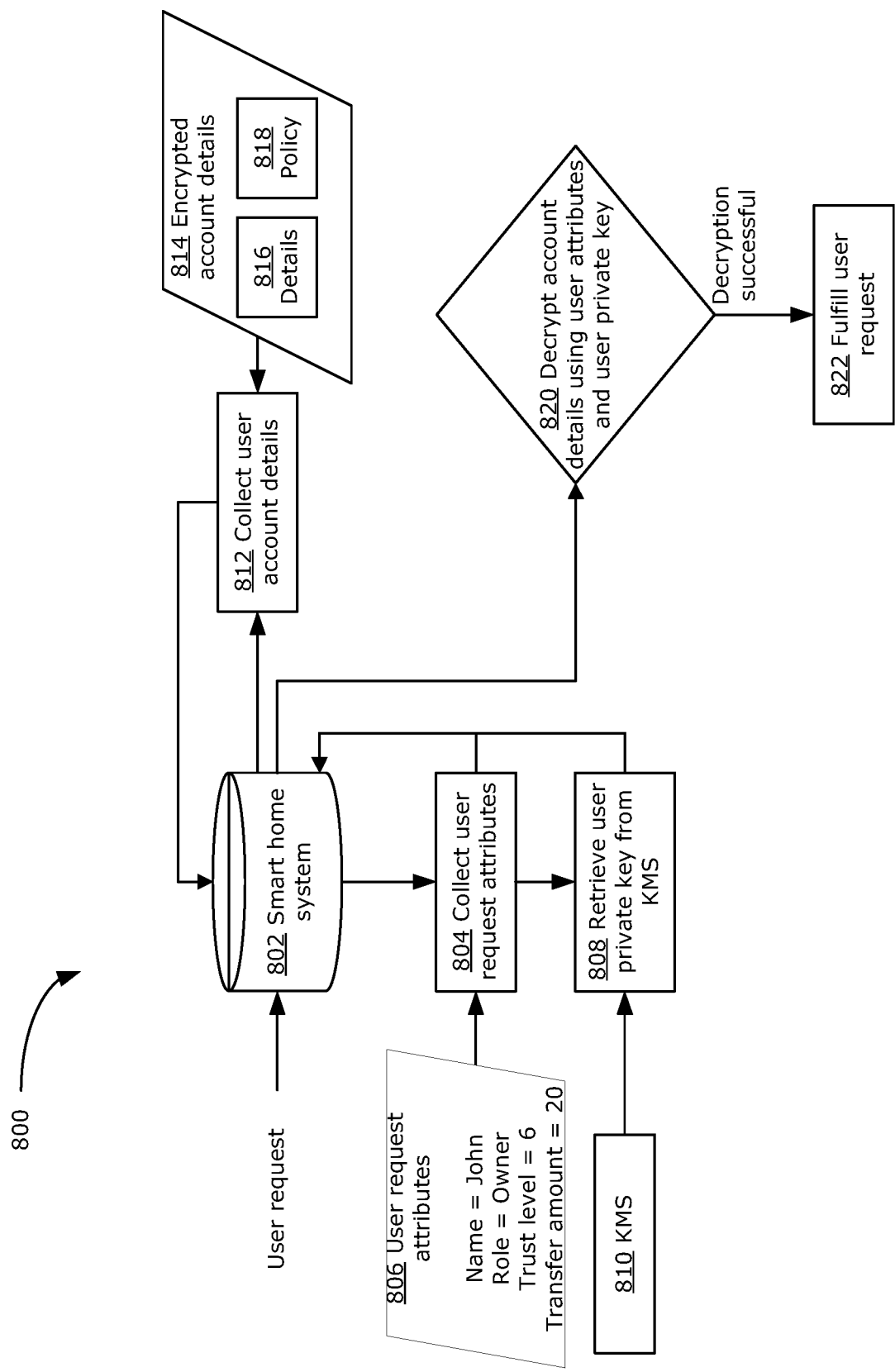
FIG. 8 is a system diagram showing the operations of an example system for controlled sharing of smart home data, in accordance with examples described herein.

FIG. 8 shows a system diagram of an example system 800 for controlled sharing of smart home data using the methods and devices described above. The operations of system 800 may be implemented using one or more computing devices, including a smart home system 802 running on some combination of cloud computing platforms, network servers, personal electronic devices, and/or smart speakers or other smart IoT appliances located within a home. The system 800 enables secure authorization of transactions and controls for users of the system based on granular permissions granted to various users in the form of an access policy.

In operation, the smart home system 802 receives a user request to e.g. perform a transaction (e.g. make an online purchase), operate a smart home control (e.g. raise the thermostat setting to 73 degrees Fahrenheit), or access a piece of data (e.g. how much milk is in the refrigerator). The user request may be received via a user interface such as a microphone or a smartphone interface, and the user making the request may be identified by some combination of the device initiating the request, voice recognition, facial recognition, a password or pass phrase, etc.

In order to determine whether the user request can be granted, the smart home system 802 collects attributes of the user request at operation 804. In this example, the user request is determined to be made by a user "John", the request is to make an online purchase of 2 bottles of shampoo for a total dollar value of $20, and the user request attributes 806 include some attributes associated with the user making the request (Name=John, Role=Owner, Trust level=6) and some attributes associated with the nature of the request (Transfer amount=20).

Once the user has been identified and the user request attributes 806 have been collected, the user's private ABE key is retrieved from a key management system 810 at operation 808.

The smart home system 802 also collects sensitive details of the user's account (e.g. banking or credit card details) at operation 812. Encrypted account details 814 are supplied to the smart home system 802, including the sensitive details 816 and the access policy 818 for the sensitive details 816, which is encoded in the encryption of the account details using ABE, as described above. This operation 812 may be performed at any time relative to operations 804 and 808.

The smart home system 802 then uses ABE decryption operation 820 to decrypt the encrypted account details 814 using the user request attributes 806 and the user's private ABE key, as described above. Some embodiments or access policy configurations may additionally require a password or pass phrase to be supplied by the user, as described above. If the decryption is successful, the user request is fulfilled at operation 822, for example by being relayed along with the sensitive account details 816 to a fulfillment module or platform. For the example user request shown in FIG. 8, this could mean relaying the user's credit card data to an online retailer platform along with authorization for a $20 transaction for 2 bottles of shampoo to be shipped to user "John".

Controlled Sharing of Health Data

Figure 9:
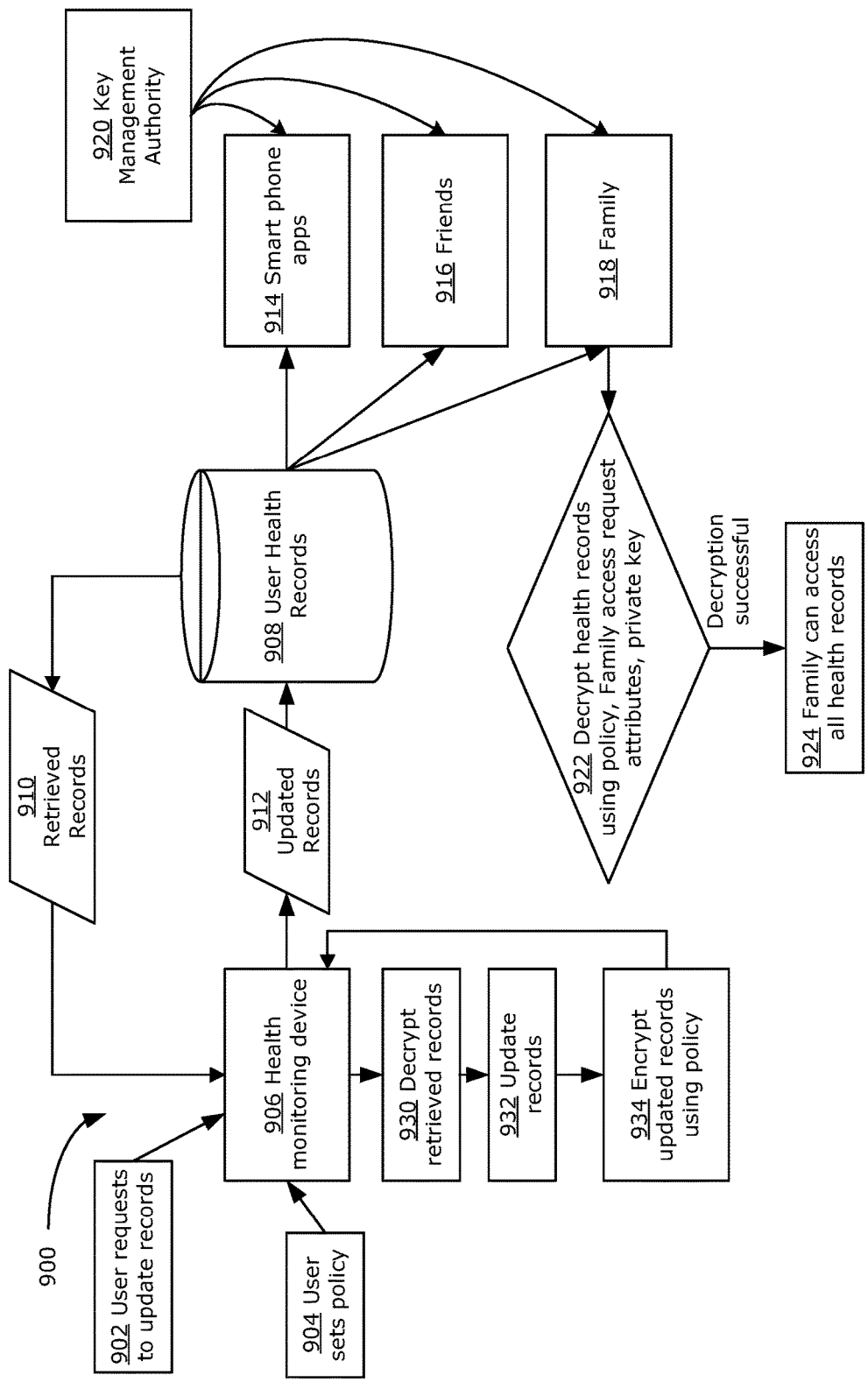
FIG. 9 is a system diagram showing the operations of an example system for controlled sharing of health data, in accordance with examples described herein.

FIG. 9 shows a system diagram of an example system 900 for controlled sharing of health data using the methods and devices described above. The operations of system 900 may be implemented using one or more computing devices, including a health monitoring device 906 such as a smart watch equipped with health monitoring sensors, and potentially including a smartphone and a cloud computing platform for managing user health records.

The system 900 allows a user to define an access policy for access to his or her health data, and also to update remotely-stored health data using e.g. new data gathered by the user's health monitoring device 906. In an example use case, a user has defined an access policy at operation 904. The access policy is defined via the user's health monitoring device 906, which is in communication with a cloud computing platform storing the user's health records 908. The health records 908 are stored securely using ABE based on the access policy defined by the user.

At operation 902, the user requests to update his or her health records 908. This update request may optionally include a new access policy defining permissions to access the health records 908, defined at operation 904.

First, the user's existing health records 908 are retrieved from the cloud computing platform by the health monitoring device 906. The encrypted retrieved records 910 are decrypted using ABE at operation 930. At operation 932, the decrypted records are updated, e.g. using user input or new data stored on the health monitoring device 906. At operation 934, the updated records are encrypted using ABE and either the existing access policy or a new access policy defined at operation 904. The encrypted updated records 912 are sent to the cloud computing platform, where they replace or supplement the existing stored user health records 908.

When a third party (i.e. any account or device other than the user's personal health monitoring device 906) wishes to access the user's health records 908, the third party must first retrieve a private ABE key from an ABE key management authority 920. The private ABE keys stored or retrieved by the ABE key management authority 920 may be generated based on each third party user's attributes.

Different third party accounts or devices may be granted different permissions under the access policy. For example, software applications ("apps") running on the user's smartphone may be granted a first, limited set of permissions to access the user's health records (e.g. view user's running statistics) based on their role attribute of "Apps" 914, whereas users with the role "Friend" 916 may be granted moderate access (e.g. view exercise routine, heart rate, and running stats), and users with the role "Family" 918 may be granted access to view all user health records 908.

Thus, if a user with role attribute value "Family" attempts to view the user's health records 908, the health records 908 are decrypted at operation 922 using ABE with inputs of the encrypted health records, the user's private ABE key, and the user's attributes. If the decryption operation 922 is successful, the user can view all health records 908 at operation 924.

Thus, the system 900 may be considered a special case or variant of system 500 in which the sender device 120 corresponds to the health monitoring device 906, cloud computing platform, and key management authority 920, and the receiver device 150 corresponds to each third party device or account.

Fine-Grained Protection of Personal Data

Figure 10:
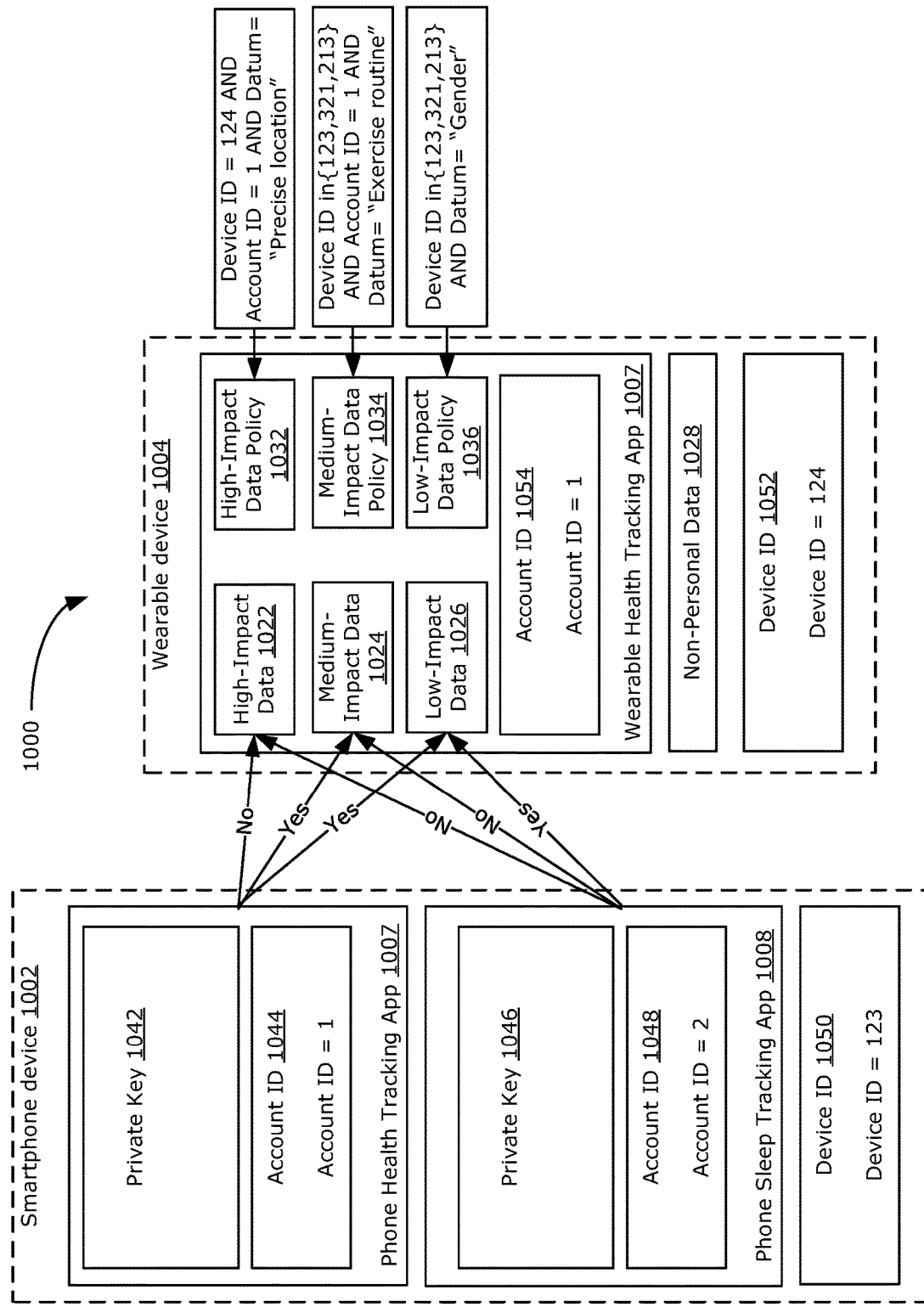
FIG. 10 is a system diagram showing the operations of an example system for fine-grained protection of personal data, in accordance with examples described herein.

FIG. 10 shows a system diagram of an example system 1000 for fine-grained protection of personal data using the methods and devices described above. The operations of system 1000 may be implemented using one or more computing devices, including a smartphone device 1002 and a wearable device 1004. The system 1000 illustrates the use of one or more access policies that define fine-grained control of access to data having different levels of sensitivity or impact.

Three tiers of data are stored by a wearable health tracking app 1006 of the wearable device 1004: high-impact data 1022, medium-impact data 1024, and low-impact data 1026. Access to specific data within each tier is controlled by access policies respective to each tier: a high-impact data policy 1032, medium-impact data policy 1034, and low-impact data policy 1036. In some embodiments, these multiple policies 1032, 1034, 1036 may be distinct access policies as described above, whereas in other embodiments, each access policy is implemented by a distinct set of attribute configurations of a single access policy. For example, a single access policy may be used wherein each piece of data in a given tier 1022, 1024,1026 may be associated with an attribute value such as "Data_sensitivity=2" for high-impact data 1022, "Data_sensitivity=1" for medium-impact data 1024, and "Data_sensitivity=0" for low-impact data 1026. In another example, each piece of data in each tier is controlled by an access policy configuration (e.g. one set of attributes is required to access high-impact datum "precise location", another set of attributed is required to access medium-impact datum "exercise routine", and so on).

The Wearable Health Tracking App 1006 runs on an account having Account identifier 1054, shown here as Account ID=1. The wearable device 1004 has a Device identifier 1052, shown here as Device ID=124. The wearable device 1004 may also store non-personal information 1028, such as clock information providing the current time and date.

The smartphone device 1002 runs a Phone Health Tracking App 1007 and a Phone Sleep Tracking App 1008. The Phone Health Tracking App 1007 runs on an account having Account identifier 1044 shown here as Account ID=1, and it has a private ABE key 1042. The Phone Sleep Tracking App 1008 runs on an account having Account identifier 1048 shown here as Account ID=2, and it has a private ABE key 1046. The smartphone device 1002 has a Device identifier 1050, shown here as Device ID=123.

If a software application of the smartphone device 1002 requests access to data stored on the wearable device 1004, the access policies 1032, 1034, 1036 define which applications on which devices can be granted access to which pieces of information stored by the Wearable Health Tracking App 1007. As shown in FIG. 10, the high-impact data policy 1032 includes an attribute configuration (Device ID=124 AND Account ID=1 AND Attribute="Precise location"), medium-impact data policy 1034 includes an attribute configuration (Device ID in{123,321,213} AND Account ID=1 AND Attribute="Exercise routine"), and low-impact data policy 1036 includes an attribute configuration (Device ID in{123,321,213} AND Attribute="Gender"). Thus, the system 1000 may effect secure sharing of information from the wearable device 1004 to the smartphone device 1002 providing fine-grained permissions by using a similar set of operations to those of system 500, wherein the wearable device 1004 assumes at least some of the functions of the sender device 120 and the smartphone device 1002 assumes at least some of the functions of the receiver device 150. This results in the access request outcomes shown in FIG. 10, namely: the Phone Health Tracking App 1007 is permitted to access the Datum "Exercise routine" in the medium-impact data 1024 or the Datum "Gender" in the low-impact data 1026, but is barred from accessing the Datum "Precise location" in the high-impact data 1022; whereas the Phone Sleep Tracking App 1008 is permitted to access the Datum "Gender" in the low-impact data 1026, but is barred from accessing the Datum "Exercise routine" in the medium-impact data 1024 or the Datum "Precise location" in the high-impact data 1022. In some embodiments, the private keys 1042, 1046 are generated in response to specific setup requests, and would therefore be limited to granting access to a specific Datum specified in the setup request.

Controlled Sharing of Data with Third Party AI Cloud Platforms

Figure 11:
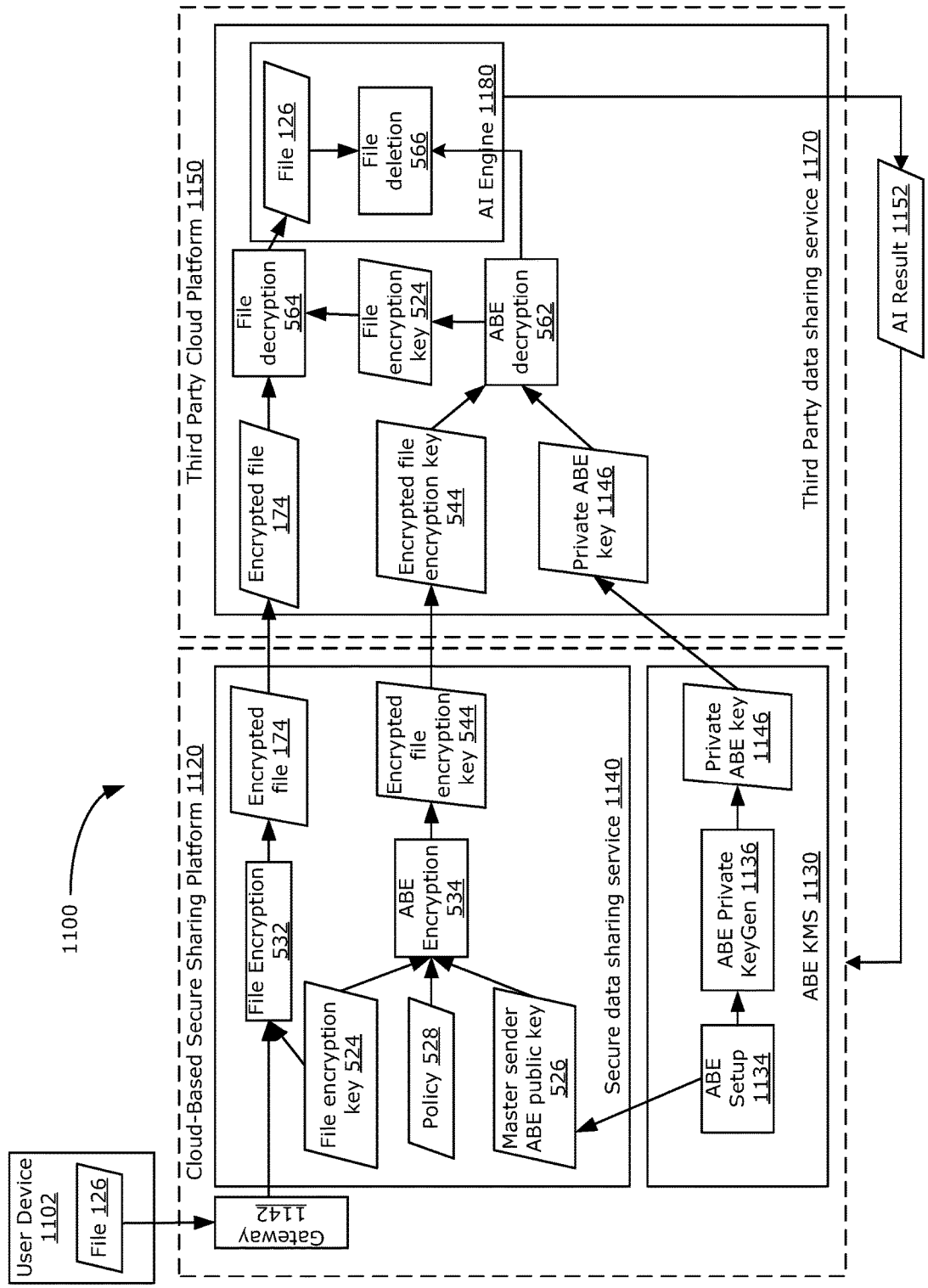
FIG. 11 is a system diagram showing the operations of an example system for controlled sharing of data with third party AI cloud platforms, in accordance with examples described herein.

FIG. 11 shown a system diagram of an example system 1100 for controlled sharing of data with third party AI cloud platforms using the methods and devices described above. The operations of system 1100 may be implemented using one or more computing devices, including a user device 1102, a Cloud-Based Secure Sharing Platform 1120 consisting of one or more devices providing cloud computing services, and a Third Party Cloud Platform 1150 consisting of one or more devices providing cloud computing services, including an AI Engine 1180 providing an artificial intelligence service.

The system 1100 enables the secure and controlled sharing of data from a user device 1102, via a trusted Cloud-Based Secure Sharing Platform 1120, with a relatively untrusted third-party application, such as the AI Engine 1180 of Third Party Cloud Platform 1150. The system 1100 operates much like the system 500 shown in FIG. 5, with the Cloud-Based Secure Sharing Platform 1120 playing the role of the sender device 120 and the Third Party Cloud Platform 1150 playing the role of the receiver device 150. Many of the data and operations of the system 1100 are the same as those of system 500; they operate as described above with reference to FIG. 5.

In system 1100, the user device 1102 (such as a smartphone or desktop computer) provides file 126 to the Cloud-Based Secure Sharing Platform 1120 via a gateway interface 1142 provided by the Cloud-Based Secure Sharing Platform 1120. The file 126 includes data that the user of the user device 1102 wishes to process using the AI service of the AI engine 1180: for example, the file 126 may constitute a photographic image taken by a camera of the user device 1102, and the AI service may process photographic images to recognize or categorize different objects shown therein. System 1100 may be used to ensure that the contents of the file 126, which may include sensitive personal information, are not misused or exposed by the Third Party Cloud Platform 1150, but are instead used only to process the image using the AI engine 1180.

Once the Cloud-Based Secure Sharing Platform 1120 receives the file 126, it encrypts it using the techniques described above with reference to FIG. 5. In the illustrated embodiment, an ABS key management system 1130 of the Cloud-Based Secure Sharing Platform 1120 may be used to perform the Setup phase of ABE 1134 and ABE Private key generation 1136, thereby generating the Master sender ABE public key 526 (which is provided to a secure data sharing service 1140 of the Cloud-Based Secure Sharing Platform 1120) and the Private ABE key 1146 (which is provided to a Third Party data sharing service 1170 of the Third Party Cloud Platform 1150). File encryption 532 and ABE encryption 534 of the file encryption key 524 are performed by the secure data sharing service 1140. The encrypted file 174 and encrypted file encryption key 544 are sent to the Third Party data sharing service 1170 of the Third Party Cloud Platform 1150.

The Third Party data sharing service 1170 performs ABE decryption 562 and file decryption 564 as in system 500 to produce decrypted file 126. File 126 is provided to the AI engine 1180, which performs its AI operations on the contents of the file 126 before performing file deletion 566. The AI result 512 of the AI operations is returned to the Cloud-Based Secure Sharing Platform 1120, which may in turn provide the AI result 512 to the user device 1102.

The access policy used in the ABE steps of system 1100 may define limits on what the Third Party Cloud Platform 1150 is allowed to do with the file 126. For example, an access policy may place an expiry date on the permissions; it may limit the number of file open attempts to a low number such as one; and it may prevent the saving or copying of file contents.

Although the present disclosure makes reference to a TEE, it should be understood that examples may be implemented using other forms of trusted intermediate environments, including any trusted environment within the sender device, within the receiver device, or at some other network entity.

Further, although the present disclosure describes examples in the context of static data, examples described herein may be generalized to any type of data including dynamic data interactions or data streams.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
receiving at a receiver device, the receiver device comprising a processor device comprising a trusted execution environment (TEE), the TEE comprising a private receiver TEE key:
    a file, encrypted using a file encryption key;
    the file encryption key, encrypted using a master public attribute-based encryption (ABE) key of a sender and an access policy for the file the access policy comprising a plurality of attribute configurations, each attribute configuration comprising a plurality of attribute values authorizing access to contents of the file; and
    a plurality of private ABE keys generated using the access policy, encrypted using a public receiver TEE key, each private ABE key corresponding to an attribute configuration;
using the trusted execution environment to apply the private receiver TEE key to decrypt the plurality of private ABE keys and provide at least a first private key of the plurality of private ABE keys to the processor device; and
using the processor device to:
    use the first private ABE key and a plurality of attribute values of the attribute configuration corresponding to the first private ABE key to decrypt the file encryption key; and
    apply the file encryption key to decrypt the file, thereby generating a decrypted file.

2. The method of claim 1, further comprising, prior to receiving the file, file encryption key, and plurality of private ABE keys:
receiving a setup request from a sender, the setup request comprising the access policy; and
in response to receiving the setup request:
    using the TEE to generate the public receiver TEE key and the private receiver TEE key; and sending a response to the sender, the response comprising the public receiver TEE key.

3. The method of claim 2, wherein the response further comprises a key attestation report comprising a device identifier of the receiver device.

4. The method of claim 3, wherein:
the receiver device further comprises a trusted clock;
the access policy comprises an expiry date for a permission of the receiver device to access the file;
the trusted execution environment applies the private receiver TEE key to decrypt the plurality of private ABE keys in response to determining that the expiry date has not been reached using the trusted clock; and
the key attestation report comprises a confirmation of the expiry date.

5. The method of claim 1,
wherein one or more of the attribute values are received from a trusted viewer, and
further comprising, after decrypting the file, using the trusted viewer to make contents of the decrypted file available to a user.

6. The method of claim 5, further comprising, after making contents of the file available to the user, using the trusted viewer to delete the decrypted file.

7. The method of claim 2,
wherein the access policy comprises a notification condition in association with an access action,
the method further comprising, in response to determining that the notification condition has been satisfied:
sending a notification to the sender, the notification identifying the access action; and
in response to determining that the notification has been successfully sent, enabling the access action at the receiver device.

8. The method of claim 7, wherein sending a notification to the sender comprises:
determining whether the sender is available to receive notifications;
in response to determining that the sender is not available to receive notifications, sending the notification to a server.

9. The method of claim 1, wherein:
the plurality of attribute values of the attribute configuration corresponding to the first private ABE key includes an attribute indicating the number of times the file has been opened at the receiver device; and
the first private ABE key is selected from the plurality of private ABE keys by the trusted execution environment in response to:
determining a number of times the file has been opened at the receiver device, N; and
determining that the plurality of attribute values of the attribute configuration corresponding to the first private ABE key includes a value for the attribute indicating the number of times the file has been opened at the receiver device that corresponds to N.

10. The method of claim 1, wherein the file encryption key is decrypted using the first private ABE key, the plurality of attribute values of the attribute configuration corresponding to the first private ABE key, and a password provided by a user.

11. A method comprising:
using a trusted execution environment (TEE) of a processor device of a sender device to decrypt an encrypted master private attribute based encryption (ABE) key of the sender device using a private sender TEE key of the trusted execution environment, thereby generating a decrypted master ABE key of the sender device;
encrypting a file using a file encryption key;
encrypting the file encryption key using the decrypted master ABE key of the sender device and an access policy for the file, the access policy comprising a plurality of receiver attribute configurations, each receiver attribute configuration comprising a plurality of receiver attribute values authorizing access to contents of the file;
generating a plurality of one or more private ABE keys using the decrypted master private ABE key of the sender device and the access policy each private ABE key corresponding to a receiver attribute configuration;
encrypting the plurality of private ABE keys using a public TEE key of a receiver device; and
sending the encrypted file, the encrypted file encryption key, and the encrypted plurality of private ABE keys to the receiver device.

12. The method of claim 11, further comprising, prior to sending the encrypted file, encrypted file encryption key, and encrypted plurality of private ABE keys:
sending a setup request to the receiver device, the setup request comprising the access policy; and
receiving a response from the receiver device, the response comprising the public receiver TEE key.

13. The method of claim 12, wherein the response further comprises a key attestation report comprising a device identifier of the receiver device.

14. The method of claim 13, wherein:
the access policy comprises an expiry date for a permission of the receiver device to access the file; and
the encrypted file, encrypted file encryption key, and encrypted plurality of private ABE keys are sent to the receiver device in response to determining that the key attestation report includes confirmation of the expiry date.

15. The method of claim 12,
wherein the access policy is a dynamic access policy,
the method further comprising, prior to decrypting the file encryption key:
sending a policy confirmation request to a dynamic policy server; and
in response to receiving a policy confirmation from the dynamic policy server indicating that the dynamic access policy is valid, decrypting the file encryption key.

16. The method of claim 15, wherein the dynamic policy server is the sender device.

17. A receiver device, comprising:
a processor device comprising a trusted execution environment (TEE), the TEE comprising a private receiver TEE key; and
a memory containing instructions that, when executed by the processor device, cause the receiver device to:
receive an encrypted file, an encrypted file encryption key, and an encrypted plurality of private ABE keys, each private ABE key corresponding to an attribute configuration of an access policy, the access policy comprising a plurality of attribute configurations, each attribute configuration comprising a plurality of attribute values authorizing access to contents of the file;
receive from the trusted execution environment a decrypted first private ABE key of the encrypted plurality of private ABE keys;

use the first private ABE key and a plurality of attribute values of the attribute configuration corresponding to the first private ABE key to decrypt the file encryption key; and apply the file encryption key to decrypt the file, thereby generating a decrypted file, the trusted execution environment being configured to decrypt the encrypted plurality of private ABE keys using the private receiver TEE key and provide the decrypted first private ABE key to the processor device.

18. The receiver device of claim 17, wherein:

the plurality of attribute values of the attribute configuration corresponding to the first private ABE key includes an attribute indicating the number of times the file has been opened at the receiver device; and the first private ABE key is selected from the plurality of private ABE keys by the trusted execution environment in response to:

determining a number of times the file has been opened at the receiver device, N; and determining that the plurality of attribute values of the attribute configuration corresponding to the first private ABE key includes a value for the attribute indicating the number of times the file has been opened at the receiver device that corresponds to N.

19. The receiver device of claim 17, further comprising a trusted clock, wherein:

the access policy comprises an expiry date for a permission of the receiver device to access the file;

the trusted execution environment applies the private receiver TEE key to decrypt the plurality of private ABE keys in response to determining that the expiry date has not been reached using the trusted clock.

20. A sender device, comprising:

a processor device comprising a trusted execution environment (TEE), the TEE comprising a private sender TEE key; and a memory containing instructions that, when executed by the processor device, cause the sender device to:

encrypt a file using a file encryption key;

encrypt the file encryption key using a decrypted master attribute based encryption (ABE) key of the sender device and an access policy for the file, the access policy comprising a plurality of receiver attribute configurations, each receiver attribute configuration comprising a plurality of receiver attribute values authorizing access to contents of the file;

generate a plurality of one or more private ABE keys using the decrypted master private ABE key of the sender device and the access policy, each private ABE key corresponding to a receiver attribute configuration;

encrypt the plurality of private ABE keys using a public TEE key of a receiver; and send the encrypted file, the encrypted file encryption key, and the encrypted plurality of private ABE keys to the receiver, the trusted execution environment being configured to decrypt an encrypted master private ABE key of the sender device using the private sender TEE key, thereby generating the decrypted master private ABE key of the sender device, and provide the decrypted master private ABE key of the sender device to the processor device.

* * * * *